US012676975B2

(12) United States Patent
Kim et al.

(10) Patent No.: US 12,676,975 B2
(45) Date of Patent: *Jul. 7, 2026

(54) METHOD FOR SPLITTING PICTURE AND DECODING APPARATUS

(71) Applicant: SK TELECOM CO., LTD., Seoul (KR)

(72) Inventors: Jae Il Kim, Seoul (KR); Sun Young Lee, Seoul (KR); Se Hoon Son, Seoul (KR); Kyung Hwan Ko, Seoul (KR); A Ram Baek, Sejong-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,706

(22) Filed: Jun. 19, 2024

(65) Prior Publication Data

US 2024/0340418 A1 Oct. 10, 2024

Related U.S. Application Data

(63) Continuation of application No. 17/767,116, filed as application No. PCT/KR2020/013522 on Oct. 6, 2020, now Pat. No. 12,052,417.

(30) Foreign Application Priority Data

Oct. 7, 2019 (KR) ........................ 10-2019-0123858
Mar. 17, 2020 (KR) ........................ 10-2020-0032688

(51) Int. Cl.
H04N 19/119 (2014.01)
H04N 19/174 (2014.01)
H04N 19/46 (2014.01)

(52) U.S. Cl.
CPC ......... *H04N 19/119* (2014.11); *H04N 19/174* (2014.11); *H04N 19/46* (2014.11)

(58) Field of Classification Search
CPC .. H04N 19/119; H04N 19/172; H04N 19/174; H04N 19/46; H04N 19/70;
(Continued)

(56) References Cited

U.S. PATENT DOCUMENTS 10,034,017 B2 7/2018 Yamamoto et al.
10,630,977 B2 4/2020 Yoo et al.
(Continued)

FOREIGN PATENT DOCUMENTS

CN 106664425 A 5/2017
JP 2001-218201 A 8/2001
(Continued)

OTHER PUBLICATIONS

Deshpande "On Tiles, Bricks and Slices" Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O0176. (Year: 2019).*
(Continued)

*Primary Examiner* — Nathnael Aynalem
(74) *Attorney, Agent, or Firm* — Hauptman Ham, LLP

(57) ABSTRACT

A method for partitioning a picture is disclosed. The method includes: decoding from a bitstream, a split flag indicating whether the picture is partitioned into one or more sub-units; decoding, from the bitstream, partition information when the split flag indicates partitioning; and partitioning the picture into the sub-units based on the partition information.

8 Claims, 20 Drawing Sheets

(58) Field of Classification Search

CPC .. H04N 19/463; H04N 19/467; H04N 19/176; H04N 19/177; H04N 19/66

USPC ............................................. 375/240–240.29

See application file for complete search history.

(56) References Cited

U.S. PATENT DOCUMENTS

| | | | |
|---|---|---|---|
| 10,630,985 B2 | 4/2020 | Johar et al. | |
| 10,735,728 B2 | 8/2020 | Seo et al. | |
| 10,863,186 B2 | 12/2020 | Yamamoto et al. | |
| 11,234,011 B2 | 1/2022 | Yamamoto et al. | |
| 11,445,187 B2 | 9/2022 | Misra et al. | |
| 11,778,182 B2 | 10/2023 | Misra et al. | |
| 2011/0292999 A1 | 12/2011 | Jeong et al. | |
| 2012/0106622 A1 | 5/2012 | Huang et al. | |
| 2013/0003824 A1 | 1/2013 | Guo et al. | |
| 2013/0022129 A1 | 1/2013 | Liu et al. | |
| 2013/0202051 A1 | 8/2013 | Zhou | |
| 2014/0205006 A1 | 7/2014 | Jeong et al. | |
| 2015/0229967 A1 | 8/2015 | Lee | |
| 2015/0373349 A1 | 12/2015 | Zhang et al. | |
| 2016/0127709 A1 | 5/2016 | Lewis et al. | |
| 2016/0156926 A1 | 6/2016 | Hashimoto et al. | |
| 2017/0026660 A1 | 1/2017 | Yamamoto et al. | |
| 2017/0118486 A1 | 4/2017 | Rusanovskyy | |
| 2017/0347099 A1 | 11/2017 | Johar et al. | |
| 2018/0270509 A1 | 9/2018 | Chuang et al. | |
| 2019/0058881 A1 | 2/2019 | Seo et al. | |
| 2019/0182498 A1 | 6/2019 | Yamamoto et al. | |
| 2020/0029082 A1 | 1/2020 | Jeon et al. | |
| 2020/0404268 A1* | 12/2020 | Choi | H04N 19/176 |
| 2021/0044838 A1* | 2/2021 | Chen | H04N 19/96 |
| 2021/0076035 A1* | 3/2021 | Hsu | H04N 19/70 |
| 2021/0099719 A1 | 4/2021 | Zhou | |
| 2021/0105469 A1 | 4/2021 | Misra et al. | |
| 2021/0127111 A1* | 4/2021 | George | H04N 19/1883 |
| 2021/0144395 A1 | 5/2021 | Yamamoto et al. | |
| 2022/0007017 A1* | 1/2022 | Lee | H04N 19/174 |
| 2022/0239949 A1* | 7/2022 | Hannuksela | H04N 19/105 |
| 2022/0377329 A1 | 11/2022 | Misra et al. | |

FOREIGN PATENT DOCUMENTS

| | | | |
|---|---|---|---|
| JP | 2017-523672 A | 8/2017 | |
| KR | 10-2015-0075065 A | 7/2015 | |
| WO | 2017/065422 A1 | 4/2017 | |
| WO | 2019/167849 A1 | 9/2019 | |

OTHER PUBLICATIONS

International Search Report issued on Jan. 5, 2021, for corresponding International Patent Application No. PCT/KR2020/013522, along with an English translation.

Written Opinion issued on Jan. 5, 2021, for corresponding International Patent Application No. PCT/KR2020/013522.

Office Action issued on Apr. 23, 2025 for corresponding Chinese Patent Application No. 202080083722.1, along with an English translation (21 pages).

Office Action issued on Oct. 16, 2025, for corresponding Korean Patent Application No. 10-2020-0032688, with its English translation, 13 pages.

Jill Boyce et al., "Sub-pictures and sub-picture sets with level derivation", JVET-O0555-v1, Jul. 3-12, 2019, 11 pages, cited in NPL No. 1.

* cited by examiner independent slice segments dependent slice segments slice boundary (A)

column boundaries row boundaries (B)

METHOD FOR SPLITTING PICTURE AND DECODING APPARATUS

CROSS-REFERENCE TO RELATED APPLICATION

The present application is a Continuation of U.S. patent application Ser. No. 17/767,116, filed on Apr. 7, 2022, which is a National Stage filing under 35 U.S.C § 371 of PCT Application No. PCT/KR2020/013522, filed on Oct. 6, 2020, which is based upon and claims the benefit of priorities to Korean Patent Application No. 10-2019-0123858, filed on Oct. 7, 2019 and Korean Patent Application No. 10-2020-0032688, filed on Mar. 17, 2020, in the Korean Intellectual Property Office. The disclosures of the above-listed applications are hereby incorporated by reference herein in their entireties.

TECHNICAL FIELD

The present disclosure relates to video encoding and decoding and, more particularly, to a method for partitioning a picture, the encoding and decoding efficiency of which has been improved through a picture partitioning method suitable for various purposes, and a decoding apparatus therefor.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

An object of the present disclosure is to provide an improved video encoding and decoding technology to meet the needs. In particular, one aspect of the present disclosure relates to the technology for improving encoding and decoding efficiency by partitioning a picture to be suitable for various purposes.

According to one aspect, the present disclosure provides a method for partitioning a picture. The method includes: decoding, from a bitstream, a split flag indicating whether the picture is partitioned into one or more sub-units; decoding, from the bitstream, partition information when the split flag indicates partitioning; and partitioning the picture into the sub-units based on the partition information.

According to another aspect, the present disclosure provides a video decoding apparatus. The apparatus comprising: a decoding execution unit configured to decode, from a bitstream, a split flag indicating whether a picture is partitioned into one or more sub-units, and decode partition information from the bitstream when the split flag indicates partitioning; and a partitioner configured to partition the picture into the sub-units based on the partition information.

As described above, according to one embodiment of the present disclosure, a picture may be partitioned to be suitable for various purposes including synthesis of sequences, bitstream packing, and parallel processing.

BRIEF DESCRIPTION OF THE DRAWINGS

FIG. 16 illustrates a partition form of slices

DETAILED DESCRIPTION

Figure 1:
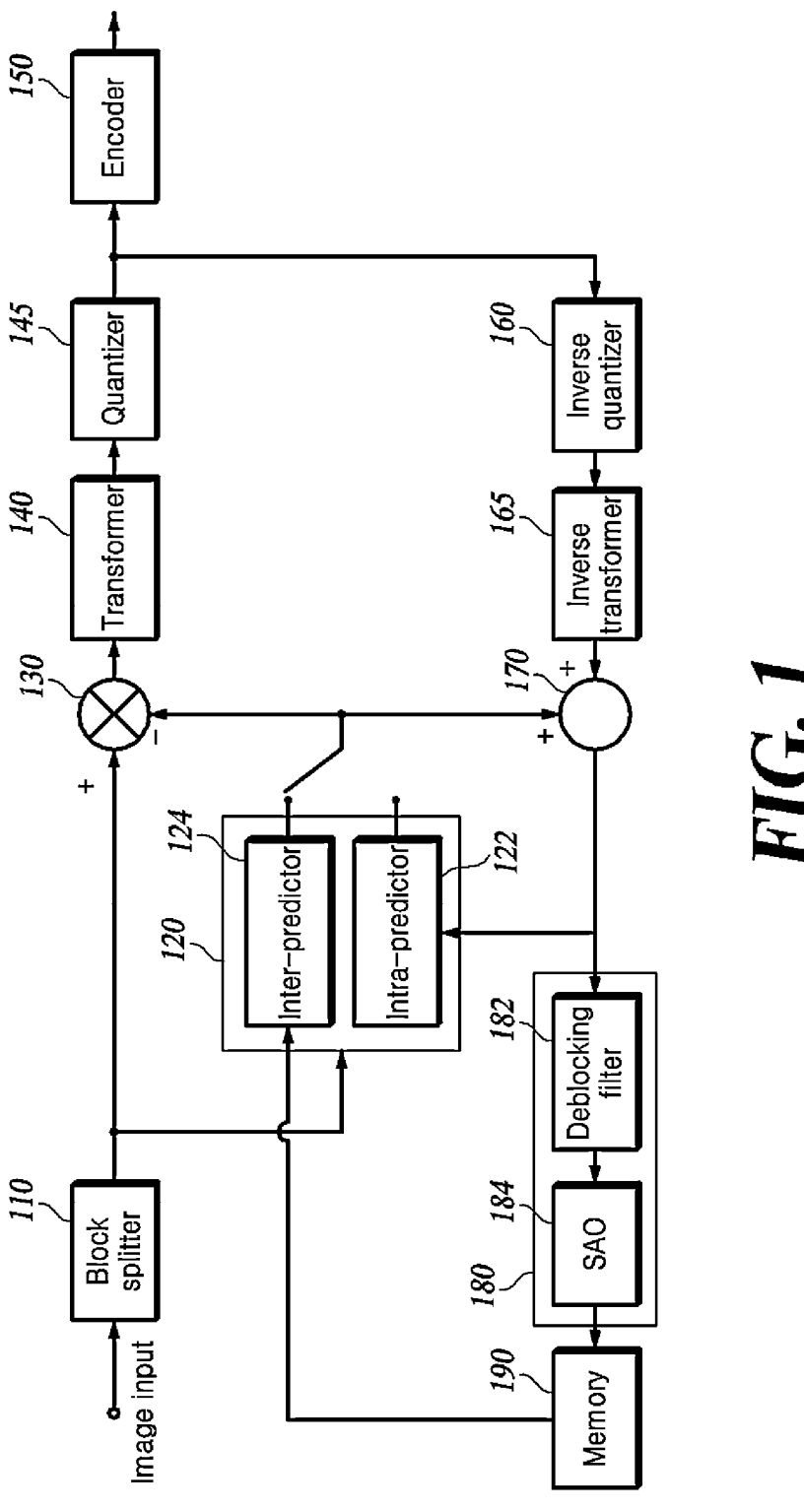
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
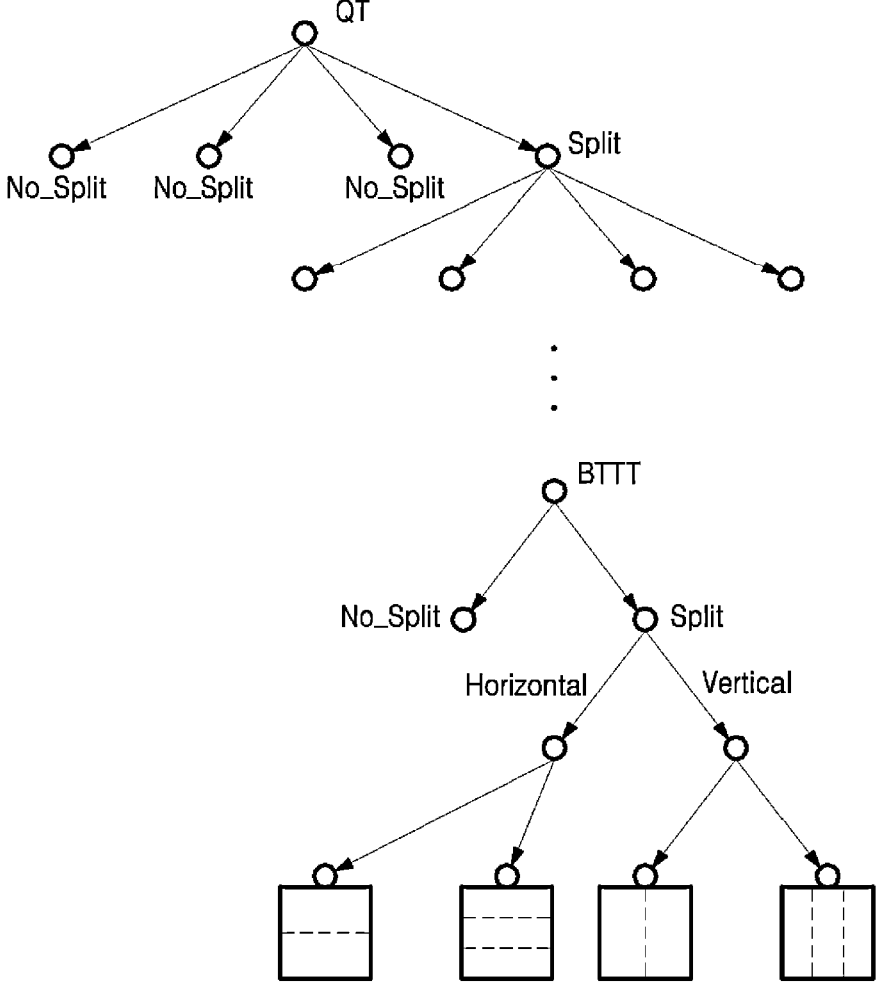
FIG. 2 exemplarily shows block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQT-Size) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
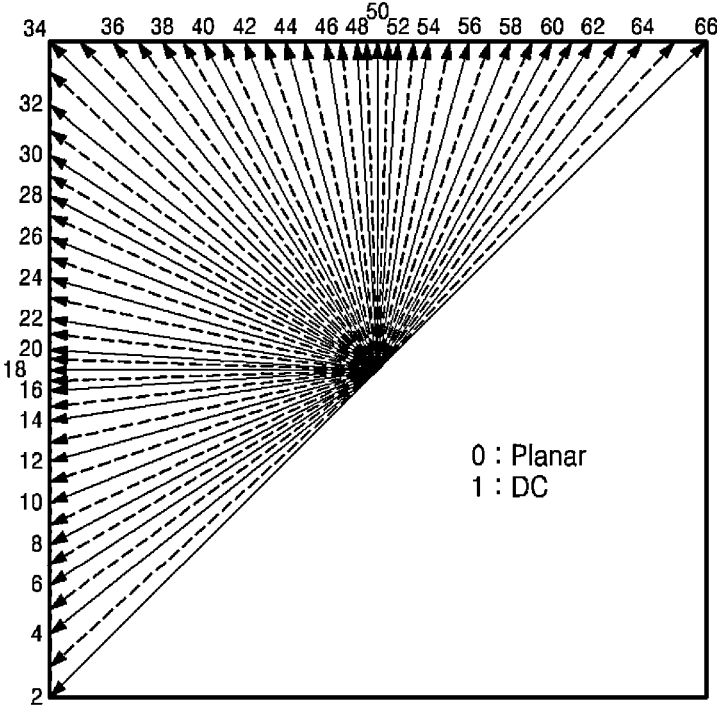
FIG. 3 exemplarily shows a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion character-istics among the tested modes.

The intra-predictor 122 selects one intra-prediction mode from among the plurality of intra-prediction modes, and predicts the current block using neighboring pixels (refer-ence pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corre-sponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtract-ing the predicted block generated by the intra-predictor 122 or the inter-predictor 124 from the current block.

The transformer 140 transforms a residual signal in a residual block having pixel values in the spatial domain into a transform coefficient in the frequency domain. The trans-former 140 may transform the residual signals in the residual block using the total size of the current block as a transfor-mation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) infor-mation (cu_sbt_horizontal_flag), and/or location informa-tion (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the split-ting is additionally encoded signaled to the video decoding apparatus by the encoder 150.

The quantizer 145 quantizes transform coefficients output from the transformer 140, and outputs the quantized trans-form coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quan-tized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and trans-formation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
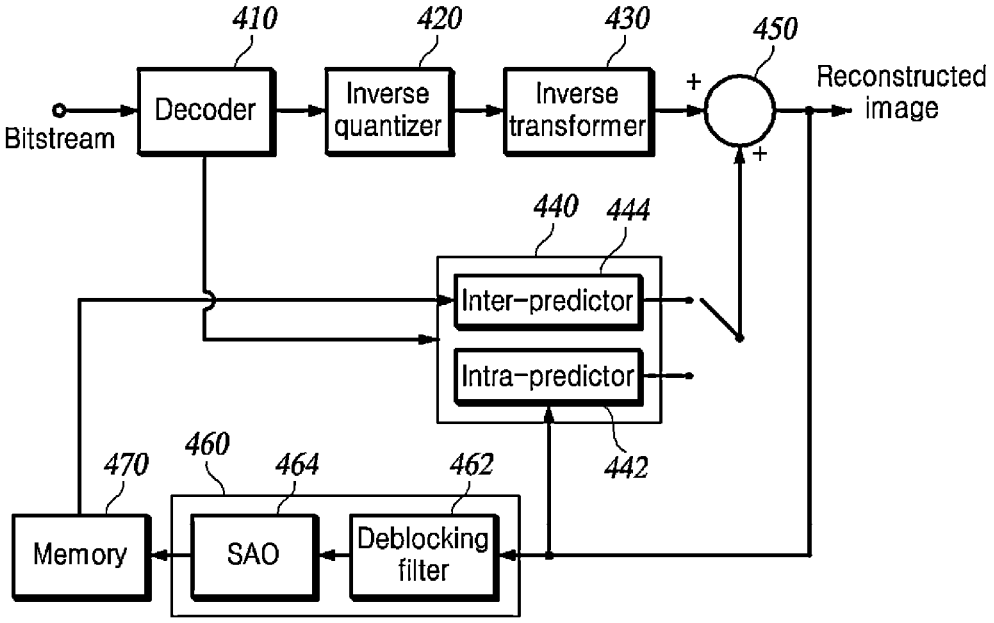
FIG. 4 is an exemplary block diagram of a video decoding apparatus capable of implementing the techniques of the present disclosure.

FIG. 4 is an exemplary functional block diagram of a video decoding apparatus capable of implementing the tech-niques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be imple-mented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block split-ting, and extracts prediction information and information on residual signals necessary to reconstruct the current block.

The decoder 410 extracts information about the CTU size from the sequence parameter set (SPS) or the picture param-eter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

There are two types of methods for partitioning a picture (an image or a screen) for parallel processing in the HEVC international standard. One is a slice partitioning method, and the other is a tile partitioning method.

1) The slice partitioning method provides a function of partitioning the picture into CTUs and encoding/decoding the CTUs by in raster scan order. Several slice segments may exist in one slice, and there are two types of slice segments. The types of slice segments include an independent slice segment and a dependent slice segment.

The independent slice segment is a slice segment that does not depend on another slice at the time of intra prediction, inter prediction, coding mode, and entropy coding. Independent slice segments have header information. The dependent slice segment is a slice segment that depends on another slice (referencing another preceding independent slice segment) at the time of intra prediction, inter prediction, coding mode, and entropy coding. The dependent slice segment refers to the header information of a preceding independent slice segment for most of the header information of the dependent slice segment. In other words, only a part of the header information of the dependent slice segment is signaled.

Figure 5:
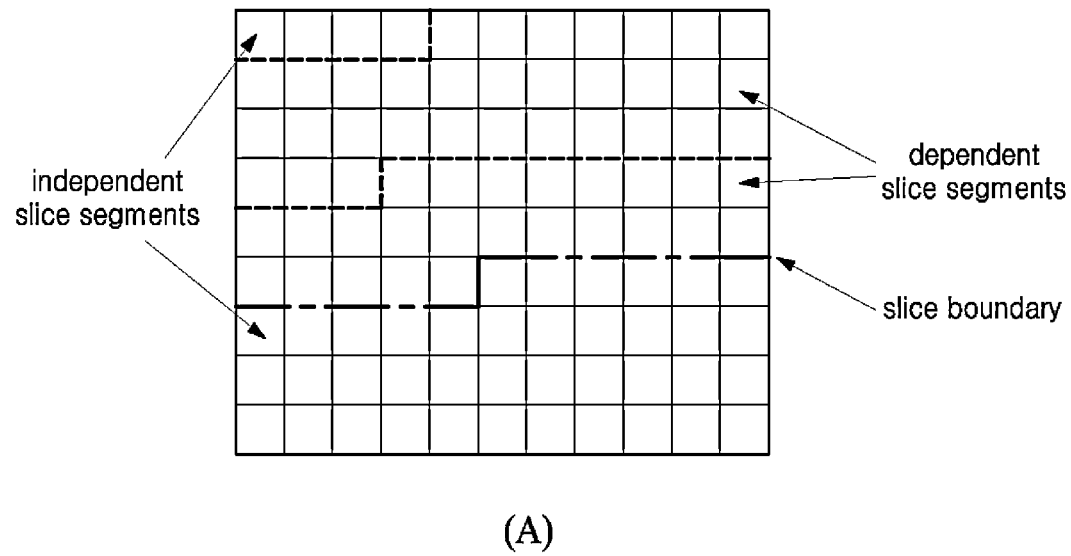
FIGS. 5 to 7 illustrate a slice, a tile, and a sub-picture.
Figure 5:
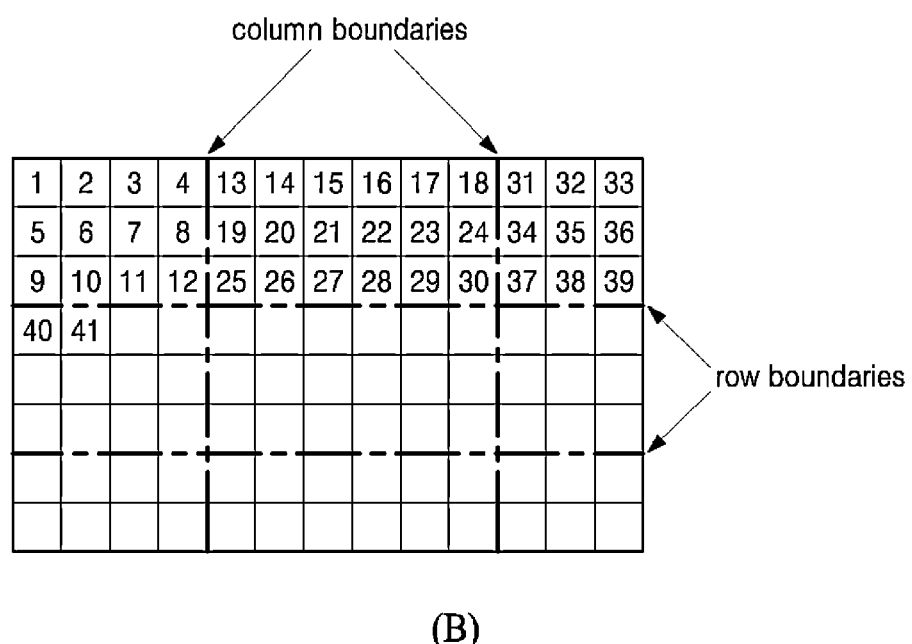

FIG. 5(A) shows two slices partitioned from a picture, and the two slices may be separated by a slice boundary. One slice may include one independent slice segment and zero or more dependent slice segments. The first slice in the upper part of the picture has one independent slice segment and two dependent slice segments separated by dotted lines. The second slice in the lower part of the picture has only one independent slice segment (including zero dependent slice segments).

Tables 1 and 2 show the syntax structure for the slice partitioning method.

TABLE 1

|  | Descriptor |
|---|---|
| pic_parameter_set_rbsp( ) { |  |
|     pps_pic_parameter_set_id | ue(v) |
|     pps_seq_parameter_set_id | ue(v) |

TABLE 1-continued

| | Descriptor |
|---|---|
| dependent_slice_segments_enabled_flag | u(1) |
| ... | |
| } | |

TABLE 2

| | Descriptor |
|---|---|
| slice_segment_header( ) { | |
| first_slice_segment_in_pic_flag | u(1) |
| if( nal_unit_type >= BLA_W_LP && nal_unit_type <= RSV_IRAP_VCL23 ) | |
| no_output_of_prior_pics_flag | u(1) |
| slice_pic_parameter_set_id | ue(v) |
| if( !first_slice_segment_in_pic_flag ) { | |
| if( dependent_slice_segments_enabled_flag ) | |
| dependent_slice_segment_flag | u(1) |
| slice_segment_address | u(v) |
| } | |
| if( !dependent_slice_segment_flag ) { | |
| ... | |
| } | |
| if(tiles_enabled_flag \|\| entropy_coding_sync_enabled_flag) { | |
| num_entry_point_offsets | ue(v) |
| if( num_entry_point_offsets > 0 ) { | |
| offset_len_minus1 | ue(v) |
| for( i = 0; i < num_entry_point_offsets; i++ ) | |
| entry_point_offset_minus1[ i ] | u(v) |
| } | |
| } | |
| ... | |
| } | |

Table 1 shows a flag (dependent_slice_segments_enabled_flag) that indicates whether dependent slice segments are allowed to be used. The flag may be defined by the PPS. Table 2 shows slice segment header information.

As shown in Table 2, a flag (first_slice_segment_in_pic_flag) indicating whether a specific slice segment is the first slice segment in a picture is first signaled. The first slice segment becomes an independent slice segment. For a slice segment other than the first slice segment, a flag (dependent_slice_segment_flag) indicating whether the slice segment is a dependent slice segment is signaled. Also, the address (slice_segment_address) of the related slice segment is signaled together. Here, slice_segment_address means an index value of the first CTU in the related slice segment.

2) The tile partitioning method provides a function of encoding/decoding a picture by segmenting/partitioning the picture into a plurality of columns and rows on a basis of CTUs. A picture may be partitioned into tiles based on a uniform partitioning scheme or an individual (non-uniform) partitioning scheme.

Each partitioned tile does not depend on other tiles during intra prediction and entropy coding, and reliance on in-loop filtering is controllable by a flag defined in the PPS. A separate header for a tile does not exist.

FIG. 5(B) shows a picture partitioned into 3×3 tiles, and each tile may be separated by tile boundaries (column boundaries and row boundaries). A plurality of tiles may be encoded/decoded in raster scan order, and a plurality of CTUs in one tile may also be encoded/decoded in raster scan order. Numbers shown in each CTU indicate the order in which encoding/decoding is performed.

The syntax structure for the tile partitioning method is shown in Table 3.

TABLE 3

| | Descriptor |
|---|---|
| pic_parameter_set_rbsp( ) { | |
| tiles_enabled_flag | u(1) |
| if( tiles_enabled_flag ) { | |
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_columns_minus1; i++ ) | |
| column_width_minus1[ i ] | ue(v) |
| for( i = 0; i < num_tile_rows_minus1; i++ ) | |
| row_height_minus1[ i ] | ue(v) |
| } | |
| loop_filter_across_tiles_enabled_flag | u(1) |
| } | |

As shown in Table 3, a flag (tiles_enabled_flag) indicating on/off of the tile partitioning is defined and signaled in the PPS. When the related flag is on, syntax elements specifying the tile size are additionally signaled.

The syntax elements specifying the tile size may include num_tile_columns_minus1 indicating a value obtained by subtracting 1 from the number of tiles (the number of tile columns) partitioned in the vertical direction, num_tile_rows_minus1 indicating a value obtained by subtracting 1 from the number of tiles (the number of tile rows) partitioned in the horizontal direction, and uniform_spacing_flag indicating whether the picture is partitioned uniformly in the horizontal and vertical directions.

When the picture is not evenly partitioned (uniform_spacing_flag-off), width information (column_width_minus1) of a tile column and height information (row_height_minus1) of a tile row are additionally signaled. Also, a flag (loop_filter_across_tiles_enabled_flag) indicating whether in-loop filtering is applied at the boundary between tiles is signaled.

Figure 6:
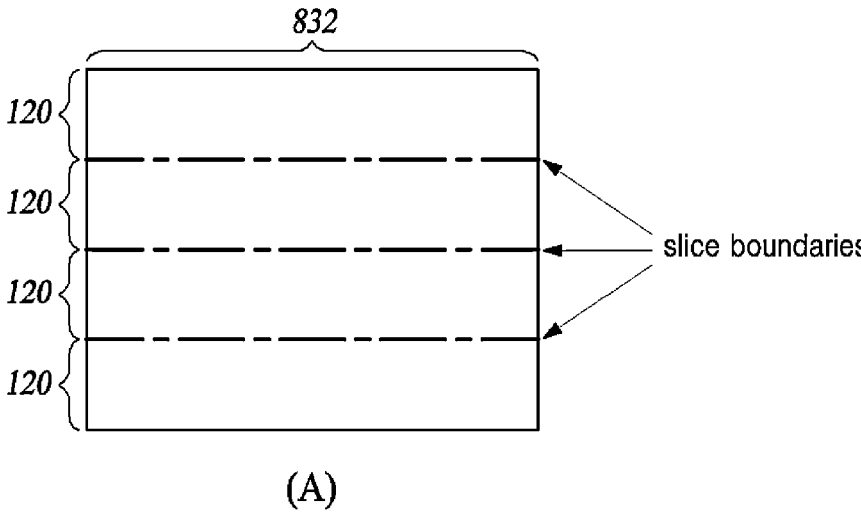
Figure 6:
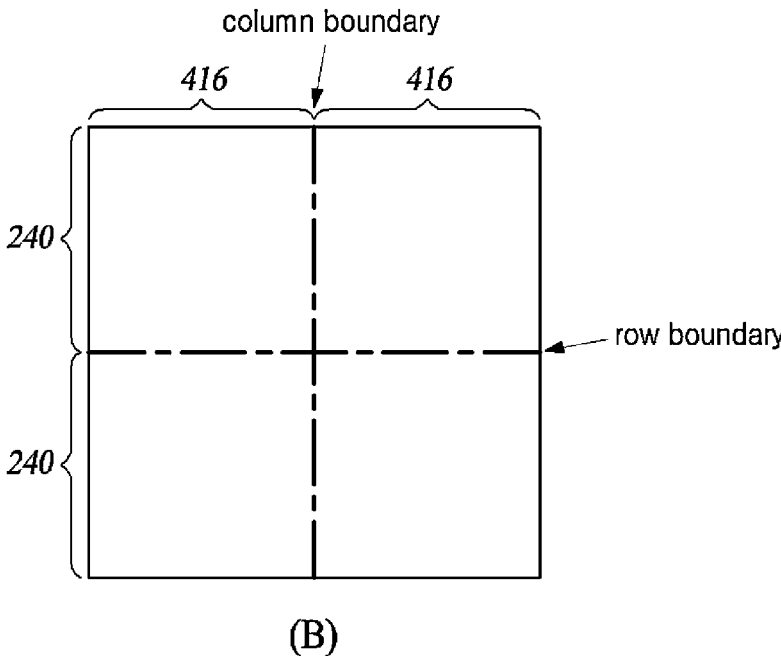

FIG. 6 shows a difference between the slice partitioning method and the tile partitioning method described above. FIG. 6 (A) shows slices (a total of 4 slices) partitioned according to the slice partitioning method, and FIG. 6 (B) shows tiles (a total of 4 tiles) partitioned according to the tile partitioning method. Each number represents the number of CTUS.

Only horizontal boundaries may exist between the partitioned slices. In contrast, horizontal and vertical boundaries may exist between the partitioned tiles.

The present disclosure proposes image partitioning methods for various purposes.

Specifically, the present disclosure proposes 1) a sub-picture partitioning method for synthesizing different sequences, 2) a slice partitioning method for bitstream packing, 3) a tile partitioning method for parallel processing, and 4) a method for expressing layout information of a sub-picture used for synthesis with other sequences and an expression method capable of configuring the layout information.

Tile, Slice, and Sub-Picture

Before the present disclosure is described in detail, tiles, slices, and sub-pictures partitioned or divided from a picture are defined.

A tile means a picture region obtained by partitioning the picture into sub-regions to process the picture in parallel. Tiles form a structure in which the tiles operate independently during intra prediction and entropy coding. In other words, tiles do not share a reference sample during intra prediction and do not share context during entropy coding.

Whether to apply in-loop filtering to the boundary between tiles may be controlled through a separate flag.

A slice means a data packing unit that configures one independent network abstraction layer (NAL) bitstream. A plurality of tiles may be included in one slice, or a plurality of slices may be included in one tile.

A slice may have two types. The first type is a rectangular slice in which tiles having similar characteristics or arbitrary tiles are designated as one region, and the second type is a raster-scan slice (non-rectangular shape) in which tiles or CTUs are designated as one region at specific locations while encoding/decoding of tiles or CTUs progresses in raster-scan order. In the latter case, the raster-scan slice in which tiles are designated as one region at specific locations while encoding/decoding progresses in tile units is a "tile based raster-scan slice," and the raster-scan slice in which CTUs are designated as one region at specific locations while encoding/decoding progresses in CTU units is a "CTU based raster-scan slice."

Figure 7:
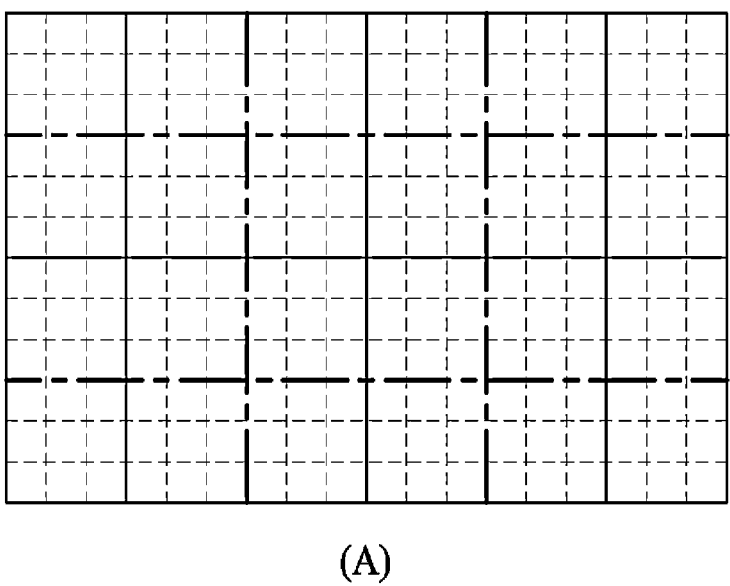
Figure 7:
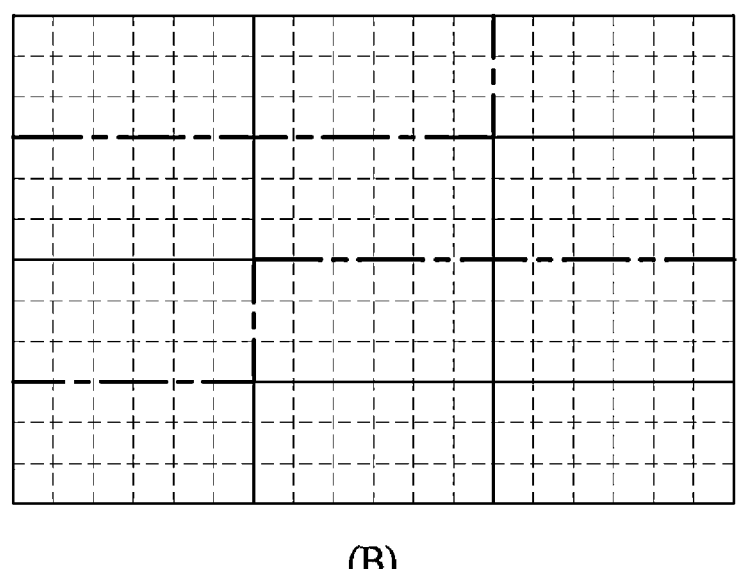

Examples of the rectangular slice and the raster-scan slice are shown in FIG. 7. In FIG. 7, an area separated by a dotted line represents a CTU, an area separated by a straight line represents a tile, and an area separated by a dash-dotted line represents a slice.

As shown in FIG. 7 (A), one picture may be partitioned into a total of 216 (18×12) CTUs, a total of 24 (6×4) tiles, and a total of 9 rectangular slices. As shown in FIG. 7 (B), one picture may be partitioned into a total of 216 (18×12) CTUs, a total of 12 (3×4) tiles, and a total of 3 raster scan slices.

A sub-picture refers to a region designated for synthesis with other content. A sub-picture may include at least one slice.

Figure 8:
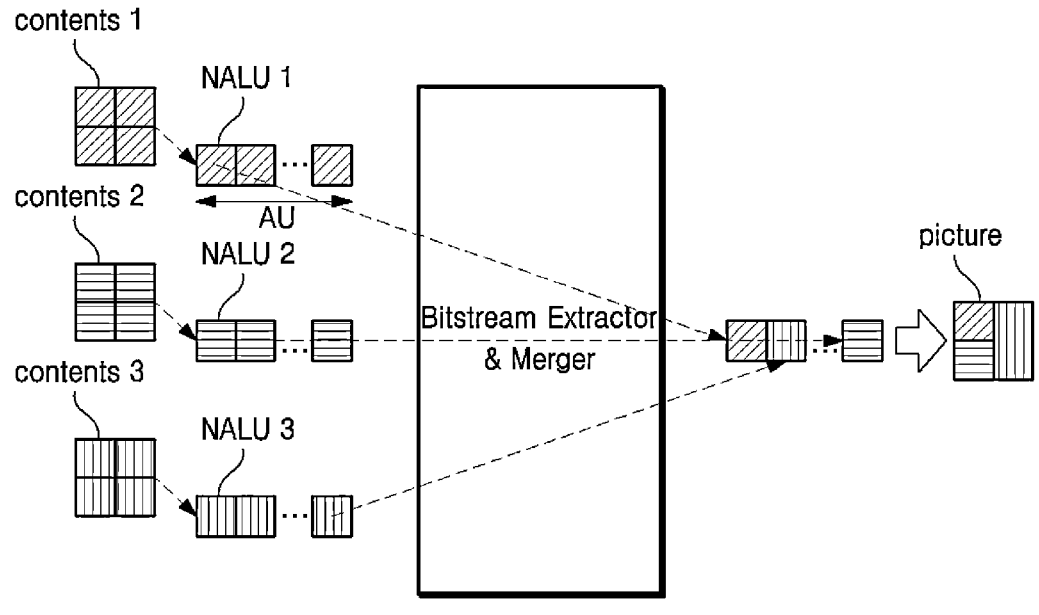
FIG. 8 illustrates synthesis of content.

FIG. 8 shows an example in which different contents are synthesized in units of sub-pictures. The area filled with oblique lines in the upper right direction means a picture in content 1. The area filled with a pattern of horizontal lines means a picture in content 2. The area filled with a pattern of vertical lines means a picture in content 3.

As shown on the left side of FIG. 8, each picture may be composed of four slices, and a bitstream may be generated for each slice unit. Also, each slice may be defined as a sub-picture. Bitstreams generated physically in units of slices are input to the bitstream extractor & merger (BEAMer) and undergo an extraction and synthesis process. Here, a logical unit of the extraction and synthesis process is a sub-picture. As a result, a new picture, in which the upper left part is content 1, the lower left part is content 2, and the right part is content 3, is generated from the synthesis.

The BEAMer extracts bitstreams generated in slice units from different contents and synthesizes the extracted bit-streams in sub-picture units. To this end, a picture of each content is partitioned into sub-pictures. In other words, a sub-picture is an area including at least one slice for content synthesis.

Figure 9:
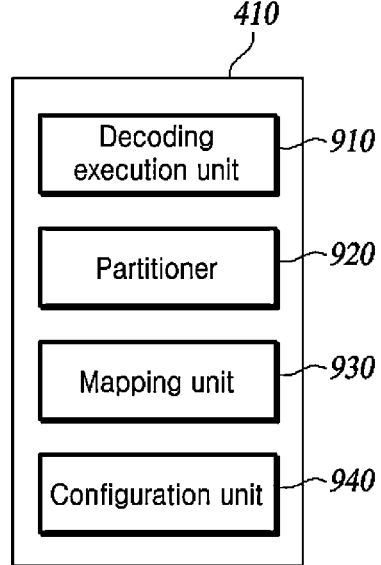
FIG. 9 is a block diagram of a decoder capable of implementing techniques of the present disclosure.
Figure 10:
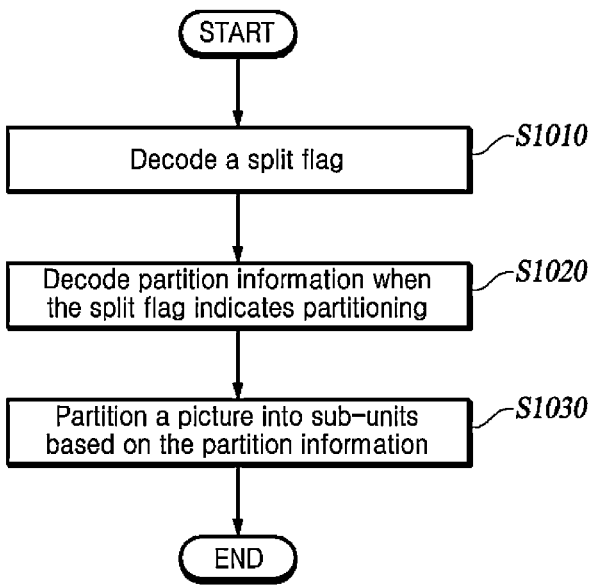
FIG. 10 is a flow diagram illustrating one example of a method capable of implementing techniques of the present disclosure.

An exemplary block diagram of the decoder 410 capable of implementing the methods of the present disclosure is shown in FIG. 9. The decoder 410 may comprise a decoding execution unit 910, a partitioner 920, a mapping unit 930, and a configuration unit 940.

The video encoding apparatus may determine whether a picture is partitioned into one or more sub-units, encode a result (split flag), and signal the encoded result. The decoding execution unit 910 may decode the split flag from a bitstream (S1010) and determine whether a picture is partitioned into sub-units based on the split flag.

A sub-unit split from a picture may include a CTU, a tile, a slice, and a sub-picture. In other words, a picture may be partitioned into CTUs, tiles, slices, and sub-pictures.

The split flag may indicate whether a picture is partitioned into sub-units or whether partitioning is applied to the picture. The split flag may be a sub-picture flag indicating whether a picture is partitioned into one or more sub-pictures or partition permission information indicating whether partitioning is applied to a picture. Specific details of the split flag will be described with reference to each embodiment.

When the split flag indicates that partitioning is applied to a picture (the picture is partitioned into sub-units), the video encoding apparatus may encode and signal partition-related information (partition information) of the picture. The decoding execution unit 910 may decode partition informa-tion from the bitstream when the split flag indicates that partitioning is applied to the picture (S1020).

The partition information may include information on the number of sub-units partitioned from the picture (number information) and information on the size (size information). In addition, the partition information may further include information on the positions of the sub-units (location information).

The partitioner 920 may partition a picture into one or more sub-units based on the partition information (using the partition information) (S1030).

Picture Partitioning

A method for partitioning a picture may include 1) a process of partitioning a picture into CTUs of a fixed size, 2) a process of partitioning, for parallel processing, a picture into tiles including at least one or more CTUs, and 3) a process of partitioning a picture into slices for generating a bitstream. Also, the method for partitioning a picture may further include 4) a process of partitioning a picture into a plurality of sub-pictures for content synthesis.

1) A picture may be partitioned into CTUs. As shown in Table 4, the video encoding apparatus may define and signal the size of a CTU at one or more levels between the SPS and the PPS; and the video decoding apparatus may decode the size of a CTU and determine the CTU size.

TABLE 4

|  | Descriptor |
| --- | --- |
| seq_parameter_set_rbsp( ) { | |
| log2_ctu_size_minus5 | u(2) |
| ... | |
| } | |

The minimum size and maximum size of a CTU may be equally limited at the video encoding apparatus and the video decoding apparatus. Table 4 shows an example in which the minimum size of the CTU is set to 32, which is 2 to the power of 5.

2) A picture may be partitioned into tiles. A tile may include at least one or more CTUs. In other words, the size (width and height) of a tile may be expressed as a multiple of the CTU size (a tile may be partitioned in units of multiples of a CTU).

Figure 11:
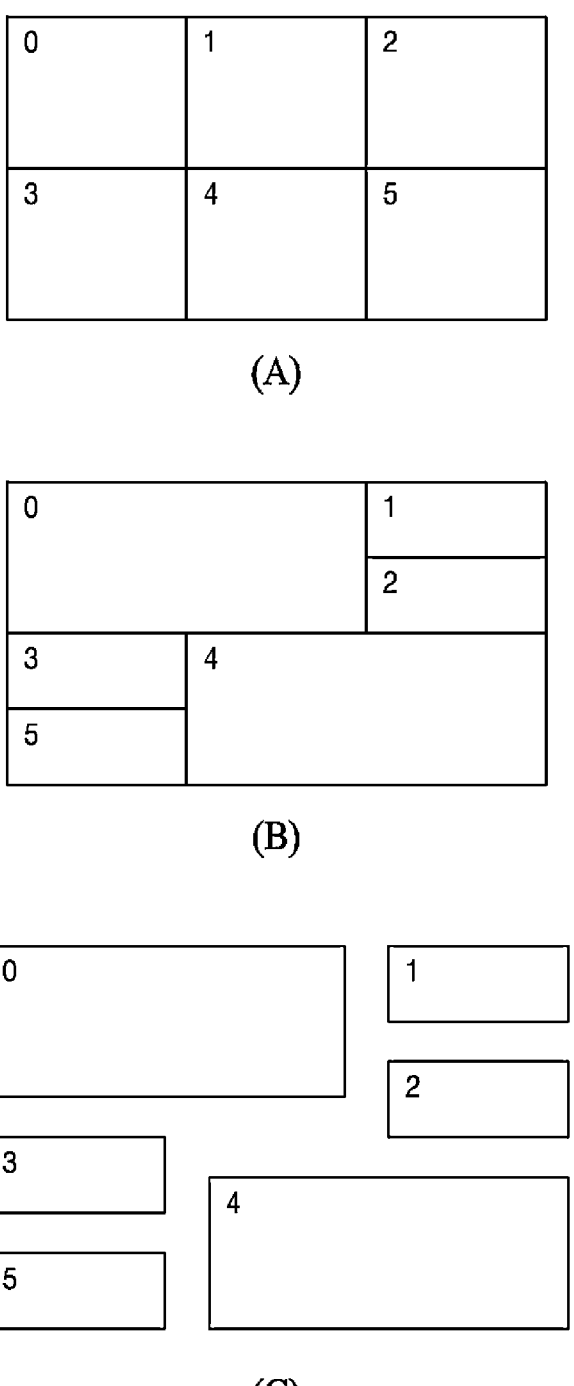
FIGS. 11 and 12 illustrate various forms of partitioning a picture into slices, tiles, and sub-pictures.

FIG. 11(A) shows an example in which a picture is partitioned into 3×2 tiles. A number indicated on each tile means an index value of the corresponding tile, and the tile index may be assigned in the raster-scan order based on how the picture is partitioned into tiles. In addition to the tile index value being assigned in the raster-scan order, the tile index value may be induced based on a specific rule. The specific rule will be described later.

3) A picture may be partitioned into slices. A picture may be partitioned such that a plurality of tiles is included in one slice, or a plurality of slices are included in one tile. In other words, slice partitioning may be performed using tiles.

FIG. 11(B) shows an example in which a picture is partitioned into a total of 6 slices. A number indicated on each slice means an index value of the corresponding slice, and the slice index may be assigned in the raster-scan order based on how the picture is partitioned into slices. Slice partitioning may be performed such that slice 0 of FIG. 11(B) includes tile 0 and tile 1 of FIG. 11(A), slices 1 and 2 of FIG. 11(B) are included in tile 2 of FIG. 11(A), slices 3 and 5 of FIG. 11(B) are included in tile 3 of FIG. 11(A), and slice 4 of FIG. 11(B) includes tiles 4 and 5 of FIG. 11(A).

In addition to the slice index value being assigned in the raster-scan order, the slice index may be induced based on a specific rule. The specific rule will be described later. Each of the total of six slices in FIG. 11(B) may be packed into a bitstream as shown in FIG. 11(C).

4) A picture may be partitioned into sub-pictures. A sub-picture may include at least one slice.

Figure 12:
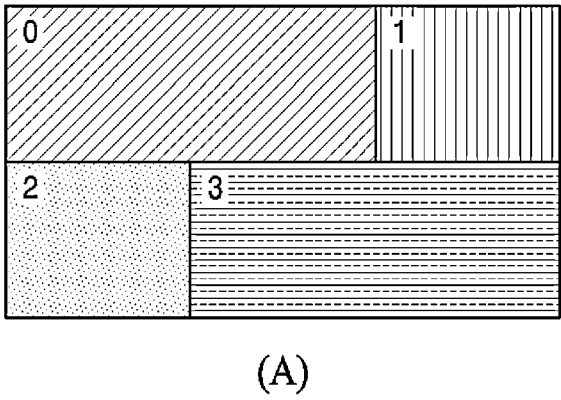
Figure 12:
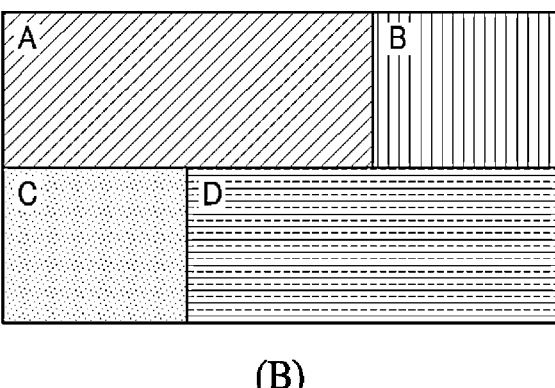
Figure 13:
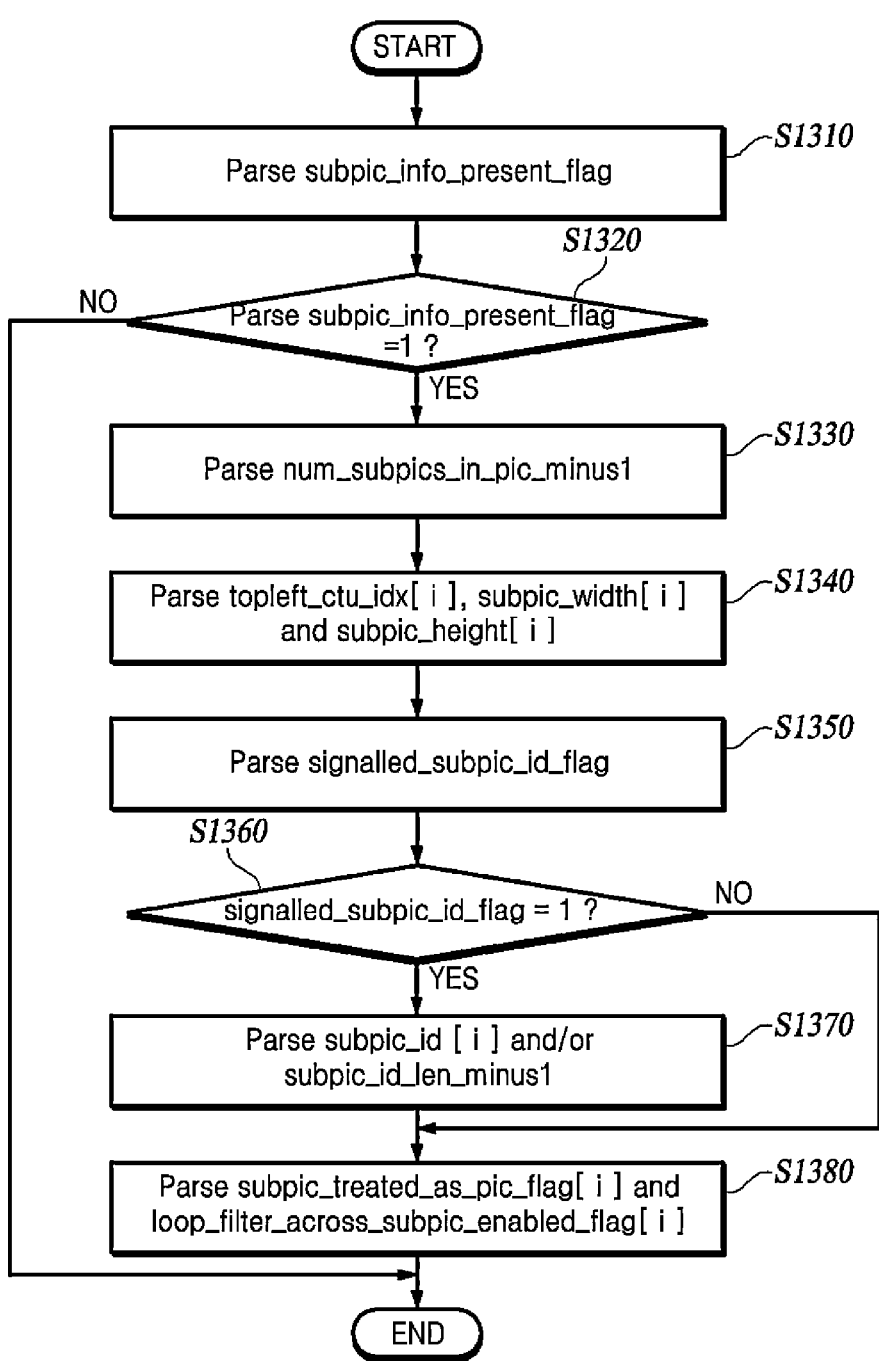
FIG. 13 is a flow diagram illustrating partitioning a picture into sub-pictures.
Figure 14:
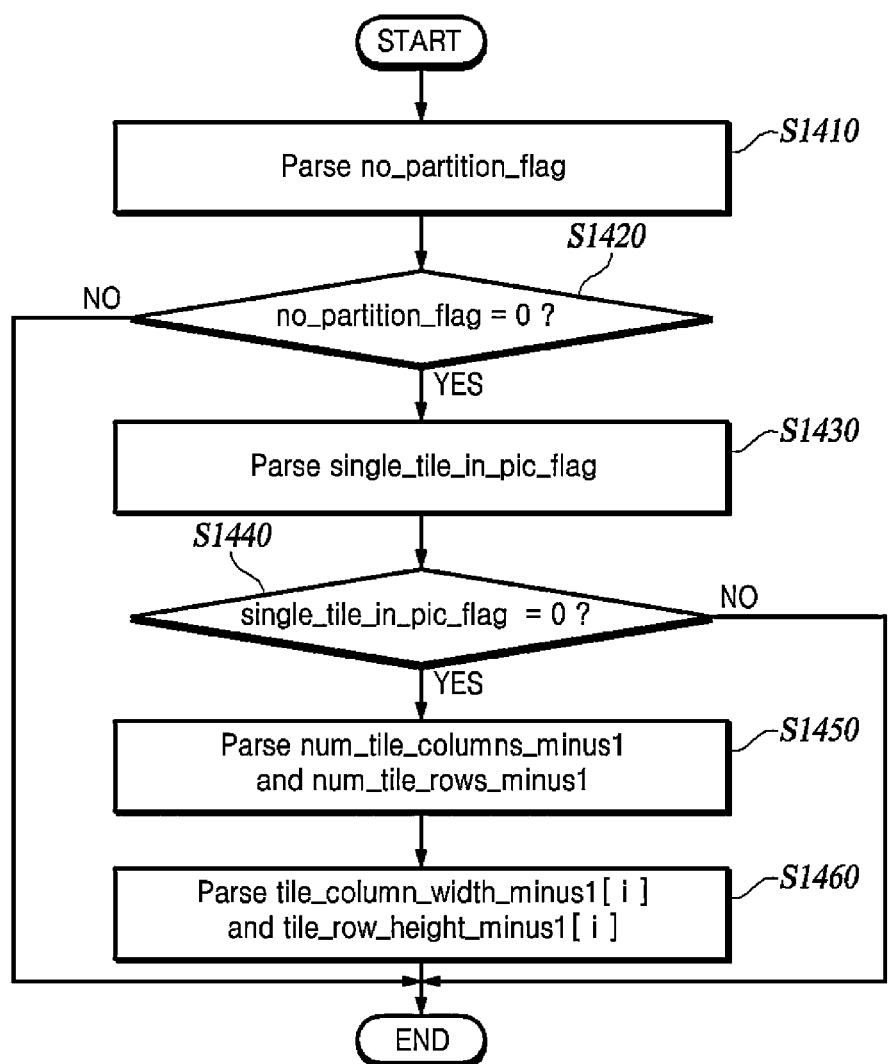
FIG. 14 is a flow diagram illustrating partitioning a picture into sub-pictures.
Figure 15:
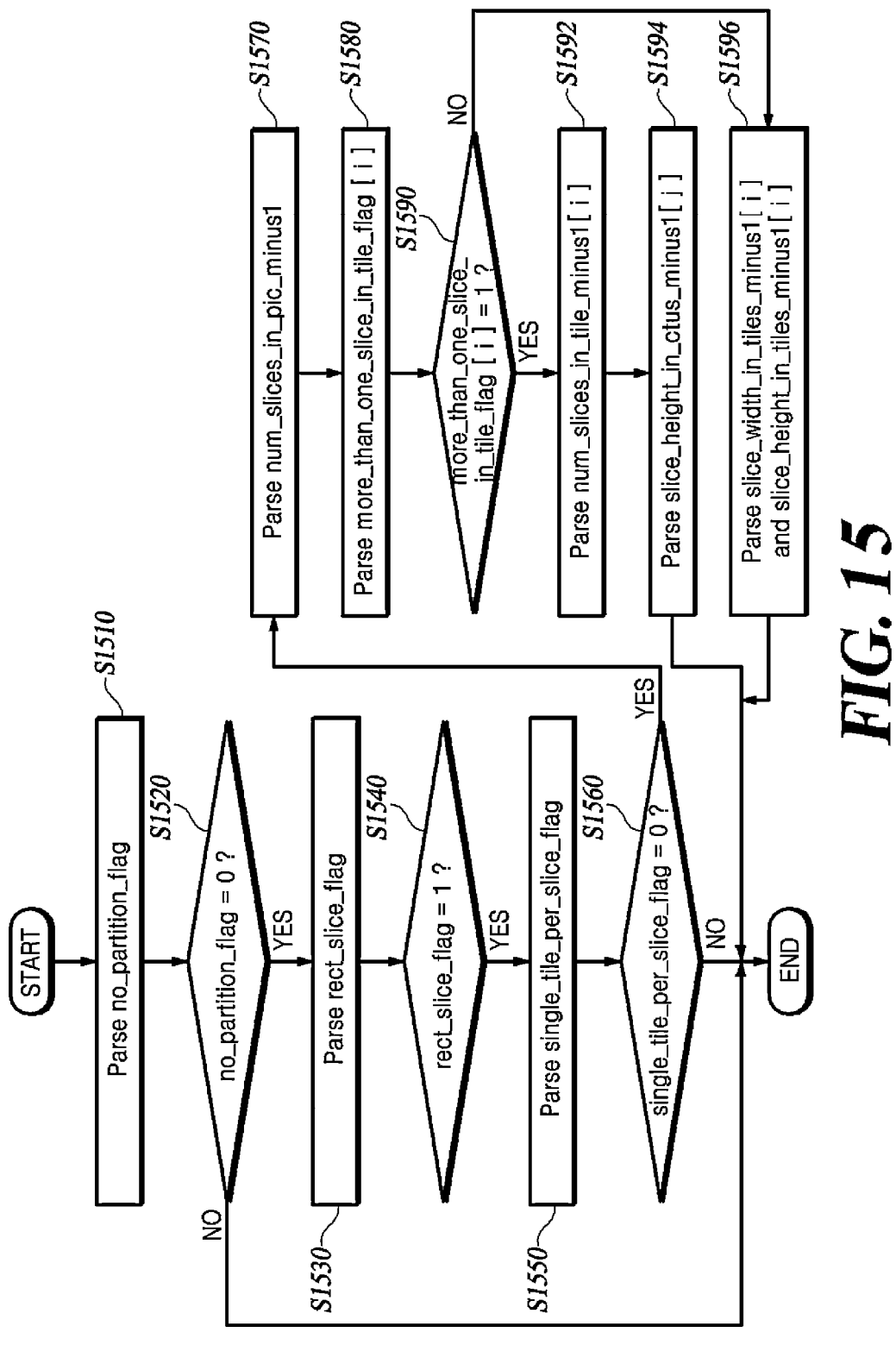
FIG. 15 is a flow diagram illustrating partitioning a picture into slices.
Figure 17:
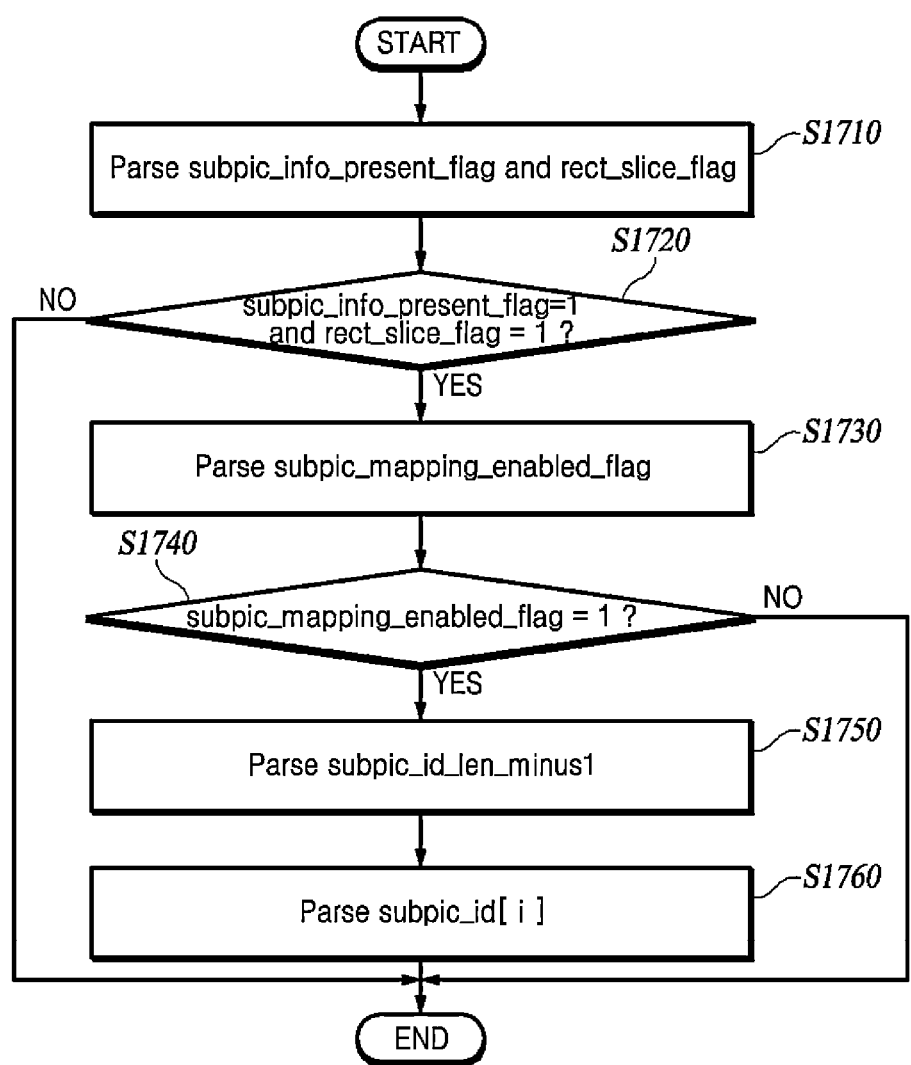
FIG. 17 is a flow diagram illustrating sub-picture mapping.
Figure 18:
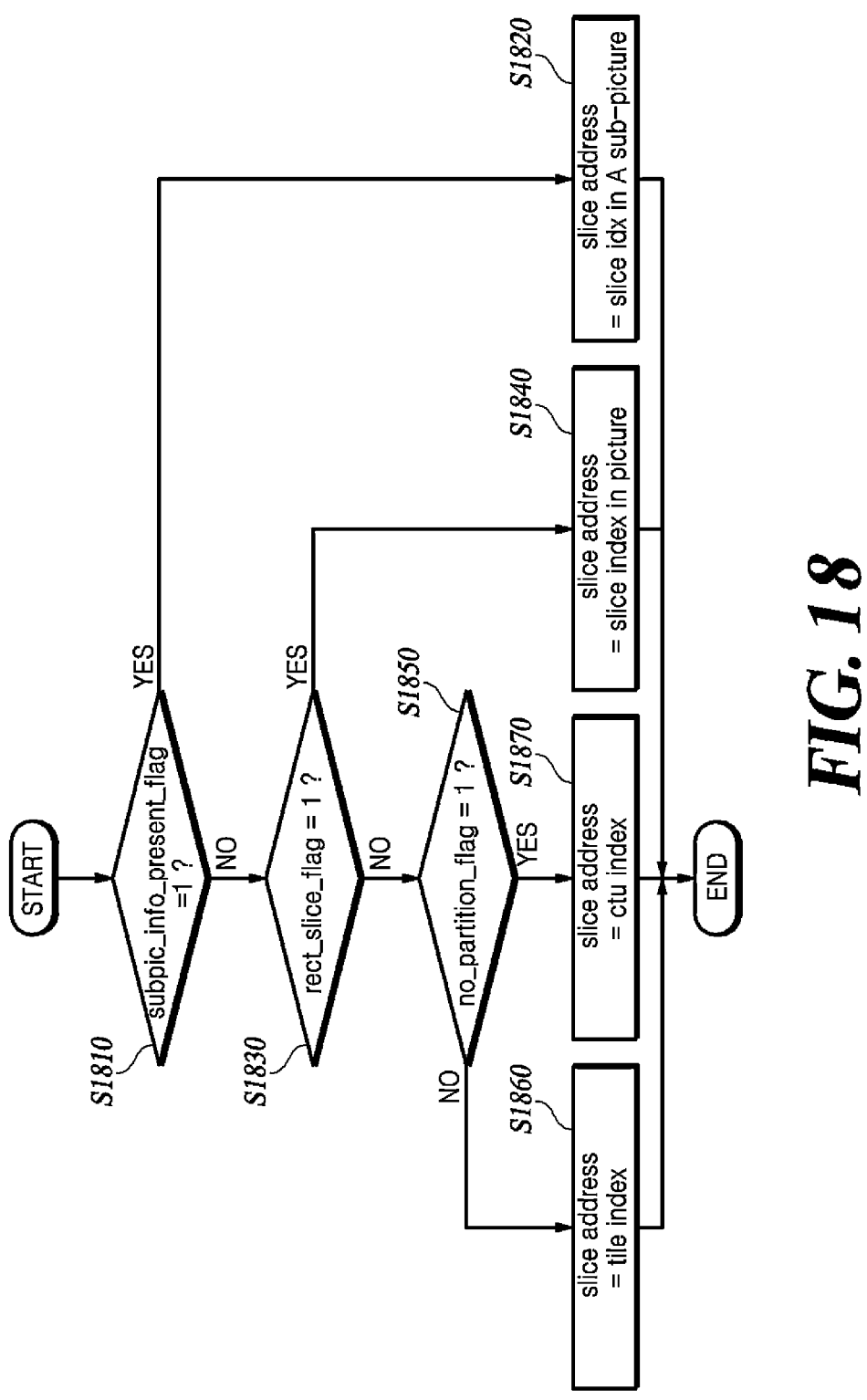
FIG. 18 is a flow diagram illustrating a slice address.

FIG. 12 shows an example in which a picture is partitioned into a total of 5 sub-pictures. FIG. 12(A) shows an example in which index values (0 to 3) are assigned to sub-pictures, and FIG. 12(B) shows an example in which identifier (id) values (A to D) are assigned to sub-pictures.

The index value of a sub-picture may be assigned in the raster-scan order based on how a picture is partitioned into sub-pictures. A picture may be partitioned into sub-pictures such that sub-picture 0 of FIG. 12(A) includes slice 0 of FIG. 11(B) and sub-picture 1 of FIG. 12(A) includes slices 1 and 2 of FIG. 11(B).

To distinguish the id value of a sub-picture from the index value of the sub-picture, an id value of a sub-picture may have a value greater than the value allowed for the index value of the sub-picture within the picture. For example, when numbers 0 to 3 are assigned to the index value of FIG. 12(A), the id value of the sub-picture (A to D of FIG. 12(B)) may be set to a value exceeding 3.

Based on the method for partitioning a picture described above, it may be seen that the sizes of a tile, a slice, and a sub-picture are all in a multiple of CTUs.

Embodiment 1

Embodiment 1 relates to a method for partitioning a picture into sub-pictures using the syntax element defined in the SPS. Embodiment 1 proposes a syntax structure and semantics related to sub-picture partitioning.

Embodiment 1-1

The video encoding apparatus may determine whether a sub-picture is present in a picture (whether a picture is partitioned into sub-pictures), encodes a sub-picture flag (subpic_present_flag or subpic_info_present_flag), which is the information on the determination result, and signals the encoded sub-picture flag. The video decoding apparatus decodes subpic_info_present_flag (S1310) and determines whether a sub-picture is present based on the subpic_info_present_flag value (S1320).

subpic_info_present_flag may indicate whether a sub-picture is present within a picture, whether sub-picture parameters exist, or whether sub-picture partitioning is performed. When subpic_info_present_flag=0, it indicates that a sub-picture does not exist while, when subpic_info_present_flag=1, it indicates that a sub-picture is present. The sub-picture flag may be subpics_present_flag.

In the presence of a sub-picture, the video encoding apparatus may encode information on the number of sub-pictures (num_subpics_in_pic_minus1) and signal the encoded information. The video decoding apparatus may decode num_subpics_in_pic_minus1 (S1330) and determine the number of sub-pictures based on num_subpics_in_pic_minus1.

num_subpics_in_pic_minus1 is a syntax element representing the value obtained by subtracting 1 from the number of sub-pictures present in a picture. In the absence of num_subpics_in_pic_minus1, the value of the corresponding syntax element may be inferred as 0. num_subpics_in_pic_minus1 may also be implemented by num_subpics_minus1.

Since at least two sub-pictures may exist in one picture, the number of sub-pictures may be implemented by the value (num_subpics_in_pic_minus2) obtained by subtracting 2 from the number of sub-pictures present in the picture.

The video encoding apparatus may encode as many pieces of information indicating the position and size of each sub-picture (position information and size information of a sub-picture) as the number of sub-pictures and signals the encoded information. The video decoding apparatus may decode as many pieces of information indicating the position and size of a sub-picture as the number of sub-pictures (S1340) and determine the position and size of each sub-picture based on the related information.

The position information of a sub-picture may be represented by an index value of the CTU at the top-left position in the sub-picture, such as topleft_ctu_idx, or by coordinates expressing the horizontal position and the vertical position of the CTU at the top-left position, such as subpic_ctu_top_left_x and subpic_ctu_top_left_y.

The size information of a sub-picture may be represented by the values indicating the width and height of the sub-picture with respect to the top-left CTU, such as subpic_width and subpic_height (that is, the number of CTUs included in the related sub-picture in the horizontal and vertical directions), or represented by the values obtained by subtracting 1 from the width and height, such as subpic_width_minus1 and subpic_height_minus1. The size information of a sub-picture may be represented by the index value (bottomright_ctu_idx) of the CTU at the bottom-right position of the related sub-picture.

The video decoding apparatus may partition a picture into sub-pictures based on decoded syntax elements (information on the number of sub-pictures, position information of sub-pictures, and size information of sub-pictures).

Meanwhile, mapping information of a sub-picture may be defined at the SPS and signaled.

Mapping may refer to associating a sub-picture with a slice. Mapping information is used to associate a sub-picture with a slice and may include the id of the sub-picture (subpic_id) and length information of the id (subpic_id_lens_minus1). The mapping information may also be referred to as configuration information of a sub-picture.

The video encoding apparatus may encode and signal mapping information, and the video decoding apparatus may decode the mapping information from a bitstream S1370. The mapping unit 930 may map sub-pictures to slices based on the mapping information.

Based on an embodiment, mapping may be determined to be performed based on the mapping flag indicating whether id mapping of a sub-picture is performed.

In the above embodiment, the video encoding apparatus may encode and signal the mapping flag. The video decoding apparatus may decode the mapping flag (S1350) and determine whether id mapping is performed based on the decoded mapping flag (S1360).

The mapping flag may be implemented by signaled_sub-pic_id_flag indicating whether the id of a sub-picture is signaled or subpic_mapping_enabled_flag indicating whether mapping of a sub-picture is allowed. Alternatively, the mapping flag may be implemented in a form including sps_subpic_id_present_flag indicating whether id mapping is performed in the SPS and sps_subpic_id_signalling_present_flag indicating whether mapping information is signaled in the SPS.

When the mapping flag indicates that mapping is performed, the video encoding apparatus may encode and signal as many sub-picture ids (subpic_id) as the number of sub-pictures (subpic_id [i]). When the mapping flag indicates that mapping is performed, the video decoding apparatus may decode as many sub-picture ids (subpic_id) as the number of sub-pictures (subpic_id [i]) (S1370) and may map sub-pictures to slices.

Table 5 shows the syntax structure for embodiment 1-1. The for-loops in Table 5 may be performed in raster-scan order.

TABLE 5

|  | Descriptor |
|---|---|
| seq_parameter_set_rbsp( ) { | |
|   sps_seq_parameter_set_id | |
|   subpic_present_flag | u(1) |
|   if( subpic_present_flag ) { | |
|     num_subpics_in_pic_minus1 | u(8) |
|     for( i = 0; i < num_subpics_in_pic_minus1; i++ ) { | |
|       topleft_ctu_idx[ i ] | |
|       subpic_width[ i ] | |
|       subpic_height[ i ] | |
|     } | |
|     signalled_subpic_id_flag | |
|     if ( signalled_subpic_id_flag ) | |
|       for( i = 0; i <= num_subpics_in_pic_minus1; i++ ) | |
|         subpic_id[ i ] | |
|     for( i = 0; i <= num_subpics_in_pic_minus1; i++ ) { | |
|       subpic_treated_as_pic_flag[ i ] | u(1) |
|       loop_filter_across_subpic_enabled_flag[ i ] | u(1) |
|     } | |
|   } | |
| } | | subpic_treated_as_pic_flag of Table 5 is a syntax element indicating whether to treat the boundary of a sub-picture as a picture boundary. For example, subpic_treated_as_pic_flag may indicate to treat the boundary of a sub-picture like a picture boundary during inter prediction (by padding of boundary pixel values). loop_filter_across_subpic_enabled_flag of Table 5 is a syntax element indicating whether to apply in-loop filtering to the boundary between sub-pictures.

The video encoding apparatus may encode and signal as many subpic_treated_as_pic_flags and loop_filter_across_subpic_enabled_flags as the number of sub-pictures. The video decoding apparatus decodes as many subpic_treated_as_pic_flags and loop_filter_across_subpic_enabled_flags as the number of sub-pictures and determines whether to treat the boundary of a sub-picture as a picture boundary and whether to apply in-loop filtering to the boundary between sub-pictures based on subpic_treated_as_pic_flag and loop_filter_across_subpic_enabled_flag.

The following shows a result obtained by applying embodiment 1-1 to the sub-picture partitioning example shown in FIG. 12(B).

subpic_info_present_flag=true(1), num_subpics_in_pic_minus1=3 (num_subpics_in_pic_minus2=2), signalled_subpic_id_flag=true(1), subpic_id={A, B, C, D}(raster-scan order).

Embodiment 1-2

Embodiment 1-2 relates to a method in which a sub-picture id is signaled independently of a mapping flag (e.g., signaled_subpic_id_flag).

In Example 1-2, processes other than the S1350 and S1360 steps may be performed in the same manner as in Example 1-1.

Specifically, the video encoding apparatus may signal the sub-picture id without signaling the mapping flag. The video decoding apparatus may decode the sub-picture id without decoding the mapping flag, i.e., except for the S1350 and S1360 steps, (S1370).

The syntax structure for embodiment 1-2 is shown in Table 6. The for-loops in Table 6 may be performed in the raster-scan order.

TABLE 6

|  | Descriptor |
|---|---|
| seq_parameter_set_rbsp( ) { | |
|   subpic_present_flag | u(1) |
|   if( subpic_present_flag ) { | |
|     num_subpics_in_pic_minus1 | u(8) |
|     for( i = 0; i <= num_subpics_in_pic_minus1; i++ ) { | |
|       subpic_id[ i ] | |
|       subpic_treated_as_pic_flag[ i ] | u(1) |
|       loop_filter_across_subpic_enabled_flag[ i ] | u(1) |
|     } | |
|   } | |
| } | |

Embodiment 1-3

Embodiment 1-3 relates to a method in which sub-picture id is signaled independently of a mapping flag, together with position information and size information of the sub-picture.

In embodiment 1-3, the S1350 and S1360 steps are excluded from among the steps of the embodiment 1-1, and the S1340 and S1370 steps may be performed together.

Specifically, after encoding and signaling the information on the number of sub-pictures, the video encoding apparatus may signal the sub-picture id together with the position information and size information of the sub-picture. After decoding the information on the number of sub-pictures (S1330), the video decoding apparatus may decode the sub-picture id together with the position information and size information of the sub-picture (S1340 and S1370).

Table 7 shows the syntax structure for embodiment 1-3. The for-loops of Table 7 may be performed in the raster-scan order.

TABLE 7

| | Descriptor |
|---|---|
| seq_parameter_set_rbsp( ) { | |
|   subpic_present_flag | u(1) |
|   if( subpic_present_flag ) { | |
|     num_subpics_in_pic_minus1 | u(8) |
|     for( i = 0; i <= num_subpics_in_pic_minus1; i++ ) { | |
|       topleft_ctu_idx[ i ] | |
|       subpic_width[ i ] | |
|       subpic_height[ i ] | |
|       subpic_id[ i ] | |
|     } | |
|   } | |
| } | |

Embodiment 1-4

Embodiment 1-4 relates to a method in which length information of a sub-picture id is signaled together with the sub-picture id.

The length information of a sub-picture id indicates the number of bits used to represent the sub-picture id and may be implemented in the form of signalled_subpic_id_length_minus1 or subpic_id_len_minus1. A sub-picture id may be expressed using as many bits as indicated by the length information of the sub-picture id.

When a mapping flag indicates that id mapping is performed, the video encoding apparatus may encode and signal the length information of the sub-picture id and the sub-picture id. When the mapping flag indicates that id mapping is performed (S1360), the video decoding apparatus may decode the sub-picture id and the length information of the sub-picture id (S1370).

Table 8 shows the syntax structure for embodiment 1-4. The for-loops of Table 8 may be performed in the raster-scan order.

TABLE 8

| | Descriptor |
|---|---|
| seq_parameter_set_rbsp( ) { | |
|   subpic_present_flag | u(1) |
|   if( subpic_present_flag ) { | |
|     num_subpics_in_pic_minus1 | u(8) |
|     signalled_subpic_id_flag | |
|     if ( signalled_subpic_id_flag ) { | |
|       signalled_subpic_id_length_minus1 | |
|       for( i = 0; i <= num_subpics_in_pic_minus1; | |
|       i++ ) | |
|         subpic_id[ i ] | |
|     } | |
|   } | |
| } | |

Embodiment 1-5

Embodiment 1-5 relates to a method in which signaling of mapping information is not performed in the SPS.

Therefore, embodiment 1-5 may exclude the S1350, S1360, and S1370 steps related to signaling of mapping information from among the steps of embodiment 1-1.

Table 9 shows the syntax structure for embodiment 1-5. The for-loops of Table 9 may be performed in the raster-scan order.

TABLE 9

| | Descriptor |
|---|---|
| seq_parameter_set_rbsp( ) { | |
|   sps_seq_parameter_set_id | |
|   subpic_present_flag | u(1) |
|   if( subpic_present_flag ) { | |
|     num_subpics_in_pic_minus1 | u(8) |
|     for( i = 0; i < num_subpics_in_pic_minus1; i++ ) { | |
|       topleft_ctn_idx[ i ] | |
|       subpic_width[ i ] | |
|       subpic_height[ i ] | |
|     } | |
|     for( i = 0; i <= num_subpics_in_pic_minus1; i++ ) { | |
|       subpic_treated_as_pic_flag[ i ] | u(1) |
|       loop_filter_across_subpic_enabled_flag[ i ] | u(1) |
|     } | |
|   } | |
| } | |

Embodiment 2

Embodiment 2 relates to a method for partitioning a picture into tiles. Embodiment 2 proposes a syntax structure and semantics related to tile partitioning. Syntax elements for the tile partitioning may be defined at the level of the PPS or picture header.

The video encoding apparatus may determine whether partitioning is applied to a picture and signal the determination result in the form of partition permission information (split flag). The video decoding apparatus may decode the partition permission information (S1410, S1430) and determine whether partitioning is applied (S1420, S1440).

The partition permission information indicates whether a picture is partitioned and may be implemented by single_tile_in_pic_flag. For example, when single_tile_in_pic_flag=1, it indicates that a picture is not partitioned into tiles while, when single_tile_in_pic_flag=0, it indicates that a picture is partitioned into a plurality of tiles.

The partition permission information may also be implemented by a combination of no_partition_flag and single_tile_in_pic_flag. When no_partition_flag=1, it indicates that no partitioning is applied to a picture while, when no_partition_flag=0, it indicates that partitioning is applied to a picture. In this case, when single_tile_in_pic_flag=1, it indicates that a picture is partitioned into one tile while, when single_tile_in_pic_flag=0, it indicates that a picture is partitioned into a plurality of tiles.

The partition permission information may also be implemented by a single syntax element, no_pic_partition_flag, based on a combination of no_partition_flag and single_tile_in_pic_flag. In this case, when no_pic_partition_flag=1, it indicates that no partition is applied to a picture while, when no_pic_partition_flag=0, it indicates that a picture is partitioned into a plurality of tiles.

When the partition permission information indicates that partitioning is applied, the video encoding apparatus may determine the number of partitioned tiles and encode and signal the information on the number of tiles. When the partition permission information indicates that partitioning is applied, the video decoding apparatus may decode the information on the number of tiles (S1450) and set the number of tiles based on the decoded information on the number of tiles.

Information on the number of tiles may include the number of tiles partitioned in the vertical direction (the number of tile columns) and the number of tiles partitioned in the horizontal direction (the number of tile rows). The number of tile columns may be expressed by a value obtained by subtracting 1 from the number of actually partitioned tile columns (num_tile_colums_minus1 or num_exp_tile_columns_minus1). The number of tile rows may be expressed by a value obtained by subtracting 1 from the number of actually partitioned tile rows (num_tile_rows_minus1 or num_exp_tile_rows_minus1).

The video encoding apparatus may recognize the size of each tile column and each tile row and encode and signal the information on the size of the tile column and the tile row (tile size information). The video decoding apparatus may decode the size information of the tile (S1460). The sizes of the tile column and the tile row may be set based on the decoded tile size information.

The size information of the tile column may be expressed by the width value (the number of CTUs) of the related tile column based on the CTU at the top-left position in the related tile column (tile_column_width_minus1). The size information of the tile row may be expressed by the height value (the number of CTUs) of the related tile row based on the CTU at the top-left position in the related tile row (tile_row_height_minus1).

Since the width of the last tile column may be inferred without a separate definition thereof, the size information of the tile column may be signaled by as many times as the number obtained by subtracting 1 from the number of tile columns. Since the height of the last tile row may be inferred without a separate definition thereof, the size information of the tile row may be signaled by as many times as the number obtained by subtracting 1 from the number of tile rows.

Example 2-1

Embodiment 2-1 relates to a method in which partition permission information is implemented by single_tile_in_pic_flag.

The video encoding apparatus may encode and signal single_tile_in_pic_flag. When single_tile_in_pic_flag=1 (S1440), the video decoding apparatus may not perform the S1450 and S1460 steps because tile partitioning is not applied. On the other hand, when single_tile_in_pic_flag=0 (S1440), since tile partitioning is applied, the video decoding apparatus may partition a picture into tiles by performing the S1450 and S1460 steps.

Table 10 shows an example of the syntax structure for embodiment 2-1. The for-loops of Table 10 may be performed in the raster-scan order.

TABLE 10

|  | Descriptor |
|---|---|
| pic_parameter_set_rbsp( ) { |  |
|    pps_seq_parameter_set_id |  |
|    pps_pic_parameter_set_id | ue(v) |
|    single_tile_in_pic_flag | u(1) |
|    if( !single_tile_in_pic_flag ) { |  |
|       num_tile_columns_minus1 | ue(v) |
|       num_tile_rows_minus1 | ue(v) |
|       for( i = 0; i < num_tile_columns_minus1; i++ ) |  |
|         tile_column_width_minus1[ i ] | ue(v) |
|       for( i = 0; i < num_tile_rows_minus1; i++ ) |  |
|         tile_row_height_minus1[ i ] | ue(v) |
|    } |  |
| } |  |

Embodiment 2-2

Embodiment 2-2 relates to a method in which partition permission information is implemented by no_partition_flag and single_tile_in_pic_flag.

The video encoding apparatus may encode and signal no_partition_flag and when no_partition_flag=0, may encode and signal single_tile_in_pic_flag. The video decoding apparatus may decode no_partition_flag (S1410) and determine whether partitioning has been applied to a picture (S1420).

Since tile partitioning is not applied when no_partition_flag=1 (S1420), the video decoding apparatus may not perform the subsequent steps. Differently from the above operation, when no_partition_flag=0 S1420, the video decoding apparatus may decode single_tile_in_pic_flag (S1430) and determine the value of single_tile_in_pic_flag (S1440).

Since a picture is partitioned into one tile when single_tile_in_pic_flag=1 (S1440), the video decoding apparatus may not perform the S1450 and S1460 steps. Differently from the above operation, when single_tile_in_pic_flag=0 (S1440), since tile partitioning is applied, the video decoding apparatus may partition a picture into a plurality of tiles by performing the S1450 and S1460 steps.

Table 11 shows an example of the syntax structure for embodiment 2-2. The for-loops of Table 11 may be performed in the raster-scan order.

TABLE 11

|  | Descriptor |
|---|---|
| pic_parameter_set_rbsp( ) { |  |
|    pps_seq_parameter_set_id |  |
|    pps_pic_parameter_set_id | ue(v) |
|    no_partition_flag |  |
|    if(!no_partition_flag) { |  |
|       single_tile_in_pic_flag | u(1) |
|       if(!single_tile_in_pic_flag) { |  |
|         (the same as Table 10) |  |
|       } |  |
|    } |  |
| } |  |

In the example of Table 11, when no_partition_flag=1, since tile partitioning is not applied, it is impossible to perform rectangular slice partitioning or configuration for a related picture. However, it is possible to perform raster-scan slice partitioning or configuration in CTU units. When single_tile_in_pic_flag=1, since a picture is partitioned into one tile, it is possible to configure one or more slices based on the one tile. On the other hand, when single_tile_in_pic_flag=0, since a picture is partitioned into a plurality of tiles, it is possible to configure a rectangular slice based on a plurality of tiles. In this case, it is also possible to configure a raster-scan slice in units of tiles.

Values of the syntax elements of embodiment 2-1 for the tile partition example shown in FIG. 11(A) are as follows.

single_tile_in_pic_flag=false(0), num_tile_colums_minus1=2, and num_tile_rows_minus1=1

Embodiment 3

Embodiment 3 relates to a method for partitioning a slice using tiles. The type of slice to be partitioned through embodiment 3 is a rectangular slice. Embodiment 3 proposes a syntax structure and semantics related to slice partitioning. Syntax elements for the slice partitioning may be defined at the level of the PPS or picture header.

Embodiment 3-1

The video encoding apparatus may determine the type of slice partitioned from a picture and signal the determination result through a type flag, rect_slice_flag. The video decoding apparatus may decode the type flag (S1530) and determine the type of slice based on the type flag (S1540).

The type flag may indicate whether the type of slice is a rectangular slice. When rect_slice_flag=0, it may indicate a raster-scan slice, and when rect_slice_flag=1, it may indicate a rectangular slice.

When a sub-picture is present (subpic_info_present_flag=1), rect_slice_flag may not be signaled and may be inferred as "1." In other words, sub-picture partitioning may be performed when the slice is a rectangular slice. When rect_slice_flag does not exist and subpic_info_present_flag=1, rect_slice_flag may be inferred as 1 (rect_slice_flag=1), and when rect_slice_flag does not exist and subpic_info_present_flag=0, rect_slice_flag may be inferred as 0 (rect_slice_flag=0).

In the case of a rectangular slice, the video encoding apparatus may encode and signal a relationship flag (single_tile_per_slice_flag) indicating a relationship between a tile and a slice. The video decoding apparatus may decode single_tile_per_slice_flag (S1550) and determine the relationship between the tile and the slice using the single_tile_per_slice_flag (1560).

Since a tile and a slice have a one-to-one relationship when single_tile_per_slice_flag=1, additional slice partition information is not signaled, and the tile partition information may be used as the slice partition information. In this case, the video decoding apparatus may partition a picture into one or more slices based on the tile partition information.

When single_tile_per_slice_flag=0, it indicates a relationship in which one slice includes a plurality of tiles or a plurality of slices are included in one tile; therefore, additional slice partition information is signaled.

The video encoding apparatus may encode and signal information on the number of slices in a picture (num_slices_in_pic_minus1) and information on whether a plurality of slices constitute one tile (more_than_one_slice_in_tile_flag[i]). After decoding num_slices_in_pic_minus1 (S1570), the video decoding apparatus may decode as many elements of more_than_one_slice_in_tile_flag[i] as the number of slices S1580.

When more_than_one_slice_in_tile_flag=1, it may indicate that a plurality of slices constitute one tile, and when more_than_one_slice_in_tile_flag=0, it may indicate that one slice includes one or more tiles.

When more_than_one_slice_in_tile_flag=1, it indicates that a plurality of slices are included in a related tile; therefore, information on the number of slices included in the tile (num_slices_in_tile_minus1) and size information (slice_height_in_ctus_minus1) of slices included in the tile may be signaled.

num_slices_in_tile_minus1 represents a value obtained by subtracting 1 from the number of slices included in the related tile. Since at least two slices may exist in one tile, num_slices_in_tile_minus1 may be changed to num_slices_in_tile_minus2. slice_height_in_ctus_minus1 represents a value obtained by subtracting 1 from the height value (the number of CTUs) of each slice included in the related tile. Here, the height of the last slice may be inferred.

After decoding the information on the number of slices (num_slices_in_tile_minus1) (S1592), the video decoding apparatus may decode as many pieces of size information of the slices (slice_height_in_ctus_minus1) as the number of slices (S1594).

When more_than_one_slice_in_tile_flag=0, one or more tiles may be included in one slice. In this case, the video encoding apparatus may encode and signal size information (size information of a slice) expressing the size of a related slice based on the number of tiles included in the related slice. The video decoding apparatus may decode the size information of the slice expressed based on the number of tiles (S1596).

The slice size information expressed based on the number of tiles may be composed of slice_width_in_tiles_minus1[i] and slice_height_in_tiles_minus1[i]. slice_width_in_tiles_minus1 represents the information on the number of tile columns of tiles belonging to a related slice (a value obtained by subtracting 1 from the number of tile columns). slice_height_in_tiles_minus1 represents the information on the number of tile rows of tiles belonging to a related slice (a value obtained by subtracting 1 from the number of tile rows).

Table 12 shows an example of the syntax structure for Example 3-1. The for-loops in Table 12 may be performed in the raster-scan order.

TABLE 12

| | Descriptor |
|---|---|
| pic_parameter_set_rbsp( ) { | |
|    rect_slice_flag | u(1) |
|    if( rect_slice_flag ) { | |
|       single_tile_per_slice_flag | u(1) |
|       if ( !single_tile_per_slice_flag ) { | |
|          num_slices_in_pic_minus1 | |
|          for( i = 0; i < num_slices_in_pic_minus1; | |
|          i++ ) { | |
|            more_than_one_slice_in_tile_flag | |
|            if ( more_than_one_slice_in_tile_flag ) { | |
|            num_slices_in_tile_minus1 | |
|            for( j = 0; j < num_slices_in_tile_minus1; | |
|            j++ ) | |
|               slice_height_in_ctus_minus1[ i++ ] | |
|            } | |
|            else { | |
|            slice_width_in_tiles_minus1[ i ] | |
|            slice_height_in_tiles_minus1[ i ] | |
|          } | |
|         } | |
|       } | |
|    } | |
| } | |

Embodiment 3-2

Embodiment 3-2 relates to a method for partitioning a slice by additionally using partition permission information (split flag, no_partition_flag). Here, the partition permission information indicates whether a picture is partitioned into a plurality of slices; when no_partition_flag=1, it indicates that the picture is not partitioned into slices while, when no_partition_flag=0, it indicates that the picture is partitioned into a plurality of slices.

The video encoding apparatus may determine whether a picture is partitioned into a plurality of slices, set the determination result as the value of the partition permission information, and signal the set information. The video decoding apparatus may decode the partition permission information (S1510) and determine whether to perform slice partitioning based on the partition permission information (S1520).

When no_partition_flag=0, a picture is partitioned into slices; therefore, the steps for slice partitioning (S1530 to S1596 steps) may be performed. However, when no_partition_flag=1, a picture is not partitioned into slices; therefore, the steps of S1530 to S1596 may not be performed. In other words, slice partitioning may not be performed.

Table 13 shows an example of the syntax structure for embodiment 3-2. The for-loops of Table 13 may be performed in the raster-scan order.

TABLE 13

| | Descriptor |
|---|---|
| pic_parameter_set_rbsp( ) | |
| if(!no_partition_flag) { | |
| rect_slice_flag | u(1) |
| if(rect_slice_flag) { | |
| (the same as Table 12) | |
| } | |
| } | |
| } | |

Figure 16:
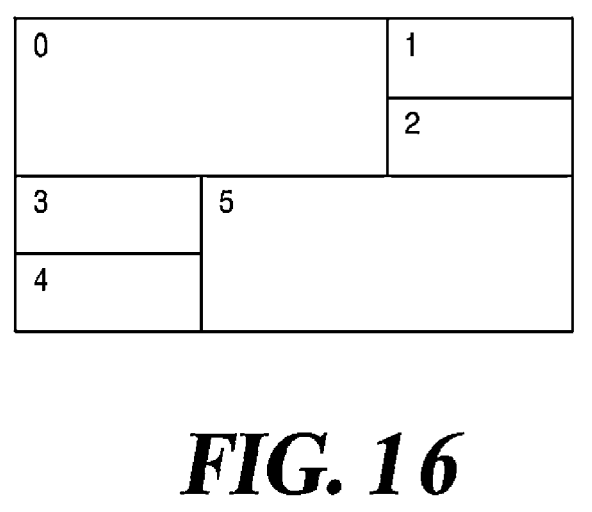

Values of the syntax elements of embodiment 3-1 for the slice partition example shown in FIG. 11(B) are as follows.
rect_slice_flag true(1), single_tile_per_slice_flag false(0), num_slices_in_pic_minus1=5
{more_than_one_slice_in_tile_flag=0, slice_width_in_tiles_minus1=1, slice_height_in_tiles_minus1=0}
{more_than_one_slice_in_tile_flag=1, num_slices_in_tile_minus1=1 (num_slices_in_tile_minus2=0), slice_height_in_ctus_minus1=the number of CTUs}
{more_than_one_slice_in_tile_flag=1, num_slices_in_tile_minus1=1 (num_slices_in_tile_minus2=0), slice_height_in_ctus_minus1=the number of CTUs}
{more_than_one_slice_in_tile_flag=0, slice_width_in_tiles_minus1=1, slice_height_in_tiles_minus1=0}
FIG. 16 shows a result obtained by assigning or deriving slice indices while slices are formed based on the slice partitioning method described above.

It may be noticed that the slice index derivation result of FIG. 16 is different from the slice index derivation result (raster-scan order) of FIG. 11(B). Specifically, the slice index 4 of FIG. 11(B) is derived as the index 5 in FIG. 16, and the slice index 5 of FIG. 11(B) is derived as the index 4 in FIG. 16.

The result of slice index derivation of FIG. 16 is obtained based on the specific rule mentioned above, where the specific rule may mean the slice partitioning method of embodiment 3.

Embodiment 4

Embodiment 4 relates to a method for signaling mapping information of a sub-picture. Embodiment 4 proposes a syntax structure and semantics related to a method for signaling mapping information.

There may exist two cases of signaling mapping information. The first case relates to a situation in which the sub-picture configuration remains the same throughout the content, and the second case relates to a situation in which the sub-picture configuration changes in the middle of the content.

When the sub-picture configuration does not change, mapping information of a sub-picture may be signaled at the level of the SPS. For example, when the position and size of a sub-picture are signaled in the SPS, mapping information of the sub-picture may also be signaled (embodiment 1).

In both the cases where the sub-picture configuration changes and does not change, mapping information of a sub-picture may be signaled at the picture header or the PPS.

In other words, position information and size information of a sub-picture may be signaled at the SPS, and mapping information of a sub-picture may be signaled at one or more of the picture header, the PPS, the slice header, and the SEI.

Since an example of signaling mapping information at the SPS has been described in embodiment 1, an example of signaling mapping information at the PPS will be described below.

The video encoding apparatus may set the value of a mapping flag based on whether the mapping information (subpic_id) exists (or whether subpic_id is signaled) and encode and signal the mapping flag. The video decoding apparatus may decode the mapping flag (S1730) and determine whether subpic_id exists (or whether subpic_id is signaled) based on the decoded mapping flag (S1740).

As described above, the mapping flag may be implemented by signaled_subpic_id_flag indicating whether the id of a sub-picture is signaled or subpic_mapping_enabled_flag indicating whether mapping of the sub-picture is allowed. When subpic_mapping_enabled_flag=0, it may mean that mapping information defined in the SPS is used while, when subpic_mapping_enabled_flag=1, it may mean that mapping information defined in the PPS is used.

In addition, the mapping flag may be implemented in such a way to include sps_subpic_id_present_flag indicating whether id mapping is performed in the SPS, sps_subpic_id_signalling_present_flag indicating whether mapping information is signaled at the SPS, and pps_subpic_id_signalling_present_flag indicating whether the mapping information is signaled at the PPS. In this case, when sps_subpic_id_present_flag=1 and sps_subpic_id_signalling_present_flag=0, pps_subpic_id_signalling_present_flag may be signaled.

The video encoding apparatus may encode and signal subpic_id when the mapping flag indicates the presence of subpic_id, i.e. indicates that mapping is applied. The video decoding apparatus may decode subpic_id when the mapping flag indicates the presence of subpic_id (S1760). The video decoding apparatus may decode as many pieces of subpic_id as the number of sub-pictures or slices.

Depending on the embodiment, the mapping information may further include length information of subpic_id (signalled_subpic_id_length_minus1 or subpic_id_len_minus1) in addition to subpic_id.

When the mapping flag indicates the presence of mapping information (S1740), the length information may be signaled from the video encoding apparatus and decoded by the video decoding apparatus (S1750).

Depending on the embodiment, whether to perform a process of signaling mapping information may be determined based on whether a sub-picture exists in a picture and whether the slice type is a rectangular slice.

The video decoding apparatus may decode subpic_info_present_flag and rect_slice_flag signaled from the video encoding apparatus (S1710) and determine whether a sub-picture exists and whether the slice type is a rectangular slice based on subpic_info_present_flag and rect_slice_flag (S1720). When a sub-picture exists and the slice type is a rectangular slice, the mapping information signaling process described above (S1730 to S1760) may be performed; however, when a sub-picture does not exist or the slice type is not a rectangular slice, the mapping information signaling process may not be performed.

Tables 14 and 15 show two syntax structures for embodiment 4. Table 14 shows signaling and decoding as many pieces of subpic_id as the number of sub-pictures. Table 15 shows signaling and decoding as many pieces of subpic_id as the number of slices.

TABLE 14

| | Descriptor |
|---|---|
| pic_parameter_set_rbsp( ) { | |
| | ue(v) |
|    if( subpic_present_flag&& rect_slice_flag ) { | |
|    subpic_mapping_enabled_flag | u(1) |
|    if( subpic_mapping_enabled_flag ) { | |
|       for( i = 0; i <= num_subpics_in_pic_minus1; i++ ) | |
|       subpic_id[ i ] | |
|    } | |
| } | |

TABLE 15

| | Descriptor |
|---|---|
| pic_parameter_set_rbsp( ) { | |
| | ue(v) |
|    if( subpic_present_flag&& rect_slice_flag ) { | |
|    subpic_mapping_enabled_flag | u(1) |
|    if( subpic_mapping_enabled_flag ) { | |
|       for( i = 0; i <= num_slices_in_pic_minus1; i++ ) | |
|       subpic_id[ i ] | |
|    } | |
| } | |

The decoded subpic_id may be arranged in a specific order as many as the number of sub-pictures or as many as the number of slices. Here, the specific order may be the raster-scan order or slice configuration order described with reference to FIG. 16.

Based on the example of Table 14, when the slices of FIG. 11(B) are mapped to the sub-pictures of FIG. 12(B), subpic_mapping_enabled_flag is equal to true(1) and the mapping is performed in order of subpic_id={A, B, C, D} (raster-scan order). Based on the example of Table 15, when the slices of FIG. 11(B) are mapped to the sub-pictures of FIG. 12(B), subpic_mapping_enabled_flag is equal to true (1) and the mapping is performed in order of subpic_id={A, B, B, C, D, C} (raster-scan order).

Based on the example of Table 14, when the slices of FIG. 16 are mapped to the sub-pictures of FIG. 12(B), subpic_mapping_enabled_flag is equal to true(1) and the mapping is performed in order of subpic_id={A, B, C, D} (raster-scan order). Based on the example of Table 15, when the slices of FIG. 16 are mapped to the sub-pictures of FIG. 12(B), subpic_mapping_enabled_flag is equal to true(1) and the mapping is performed in order of subpic_id={A, B, B, C, C, D} (slice configuration order).

Embodiment 5

Embodiment 5 proposes a syntax structure and semantics defined in the slice header. Tables 16 and 17 show two syntax structures for embodiment 5.

TABLE 16

| | Descriptor |
|---|---|
| slice_header( ) { | |
|    slice_pic_parameter_set_id | ue(v) |
|    slice_pic_header_id | ue(v) |
|    if ( subpic_present_flag ) | |
|      subpic_id | |
|    slice_address | ue(v) |
|    slice_type | |
| } | |

TABLE 17

| | Descriptor |
|---|---|
| slice_header( ) { | |
|    slice_pic_parameter_set_id | ue(v) |
|    slice_pic_header_id | ue(v) |
|    if ( subpic_present_flag&& rect_slice_flag ) | |
|      subpic_id | |
|    slice_address | ue(v) |
|    slice_type | |
| } | | slice_pic_parameter_set_id indicates the ID of the PPS referenced by the related slice, and slice_pic_header_id indicates the id of the picture header referenced by the related slice.

As shown in Table 16, the id of a sub-picture (subpic_id), address information of a slice (slice_address), and the type of the slice (slice_type) may be signaled from the video encoding apparatus. To distinguish the subpic_id (or slice_subpic_id) signaled in the slice header from the sub-pic_id (sps_subpic_id or pps_subpic_id) signaled in the SPS or PPS, the subpic_id signaled in the SPS or PPS may be referred to as "first mapping information," and the subpic_id signaled in the slice header may be referred to as "second mapping information." In other words, the "mapping information" mentioned in the present disclosure may include the first mapping information and the second mapping information. subpic_id signaled in the slice header indicates the id of the sub-picture to which the related slice belongs. The id of the sub-picture may be signaled when the sub-picture is present (when subpic_info_present_flag=1, i.e., the split flag indicates partitioning) (Table 16), or when the slice type is a rectangular slice (rect_slice_flag=1) while the sub-picture is present (subpic_info_present_flag=1) (Table 17).

The id (second mapping information) of a sub-picture signaled in the slice header may mean the index value of the sub-picture when the id (first mapping information) of the sub-picture is not signaled in the SPS or PPS. In other words, when the sub-picture flag is off in the SPS (e.g., signaled_subpic_id_flag=0) or the sub-picture flag is off in the PPS (e.g., subpic_mapping_enabled_flag=0), the id of the sub-picture is not signaled in the SPS and the PPS; in this case, the id of the sub-picture signaled in the slice header may correspond to the index value of the sub-picture as shown in FIG. 12(A).

On the contrary, when the id of the sub-picture is signaled in the SPS or PPS, the id of the sub-picture signaled in the slice header may correspond to the id value of the sub-picture as shown in FIG. 12(B). In this case, the video decoding apparatus may map the id of the sub-picture signaled from the SPS or PPS to the id of the sub-picture signaled from the slice header.

Meanwhile, as shown in Tables 16 and 17, the video encoding apparatus may encode and signal address information of a slice (slice_address), and the configuration unit 940 may use the address information to set the index value of the slice.

The address information may indicate an address of a related slice. The address information may have a different meaning depending on the values of a sub-picture flag (subpic_info_present_flag), a type flag (rect_slice_flag), and/or partition permission information (e.g., no_partition_flag).

First, when subpic_info_present_flag=1 (S1810), the address information may be an index value of a slice in a sub-picture to which the related slice belongs (S1820). For example, as shown in FIG. 12(B), when a sub-picture is present, the address information may be a slice index value for a sub-picture to which the related slice belongs.

When subpic_info_present_flag=0 (S1810) and rect_slice_flag=1 (S1830), the address information may be an index value of a slice within the entire picture (S1840). For example, as in FIG. 11(B) or FIG. 16, when a sub-picture does not exist, the address information may be a slice index value for the entire picture.

When subpic_info_present_flag=0, the information on the number of sub-pictures (num_subpics_in_pic_minus1) is not signaled, and when the information on the number of sub-pictures does not exist, the number of sub-pictures is inferred as 1 (num_subpics_in_pic_minus1=0). As a result, when subpic_info_present_flag=0 (S1810) and rect_slice_f-lag=1 (S1830), the address information may be an "index value of a slice within the entire sub-picture." Herein, the sub-picture may mean the entire picture.

When subpic_info_present_flag=0 (S1810) and rect_slice_flag=0 (S1830), in other words, in the case of a raster-scan slice, the address information may be the index value of a tile or the index value of a CTU (S1860, S1870). When a raster-scan slice is designated as one region at a specific location while encoding/decoding of tiles pro-gresses in raster-scan order, the address information may be the index value of a tile (S1860). On the other hand, when a raster-scan slice is designated as one region at a specific location while encoding/decoding of CTUs progresses in raster-scan order (without tile partitioning), the address information may be the index value of a CTU (S1870).

Depending on the embodiment, whether the address infor-mation corresponds to the index value of a tile or the index value of a CTU may be determined based on the value of partition permission information.

For example, when a picture is partitioned into one or more tiles (no_partition_flag=0, S1850), the address infor-mation may be an index value of the tile (S1860), and when the picture is not partitioned (no_partition_flag=1, S1850), the address information may be an index value of the CTU (S1870).

Figure 19:
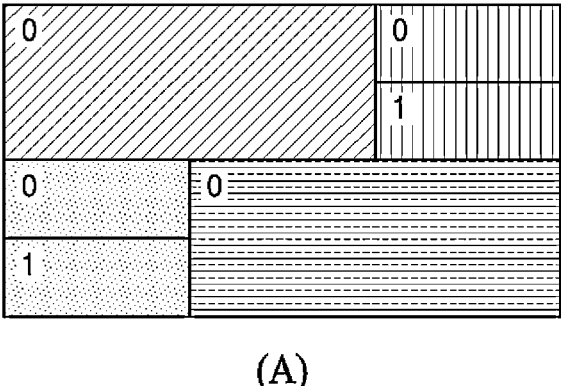
FIG. 19 illustrates a relationship between a slice and a sub-picture.
Figure 19:
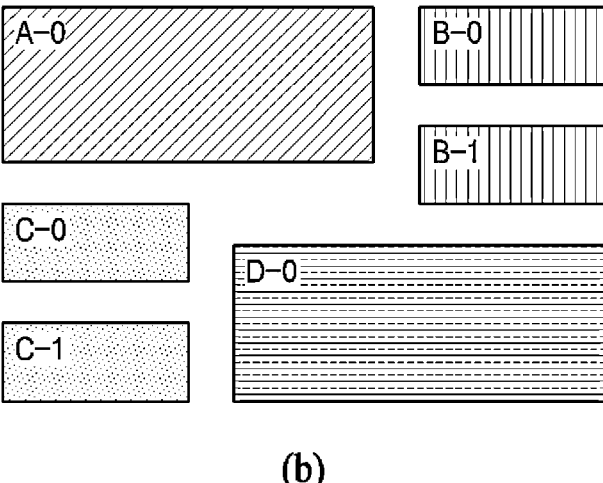

FIG. 19 shows a relationship between sub-pictures and slices partitioned based on the proposed methods of the present disclosure.

In FIG. 19 (A), each of the six rectangles represents a slice, and the slices are composed of a total of four sub-pictures as in the partitioning example of FIG. 12(B). The sub-pictures are distinguished by different patterns. The tiles are composed of a total of 6 (3×2) tiles as in the partition form of FIG. 11(A).

Since a total of six slices are present, the slices are generated from a total of six NAL bitstreams as shown in FIG. 19(B), and a picture may be partitioned into four sub-pictures.

The syntax element values of the six slice headers for the example of FIG. 19(B) are as follows.

1: (subpic_id=A, slice_address=0)
2: (subpic_id=B, slice_address=0)
3: (subpic_id=B, slice_address=1)
4: (subpic_id=C, slice_address=0)
5: (subpic_id=C, slice_address=1)
6: (subpic_id=D, slice_address=0)

Figure 20:
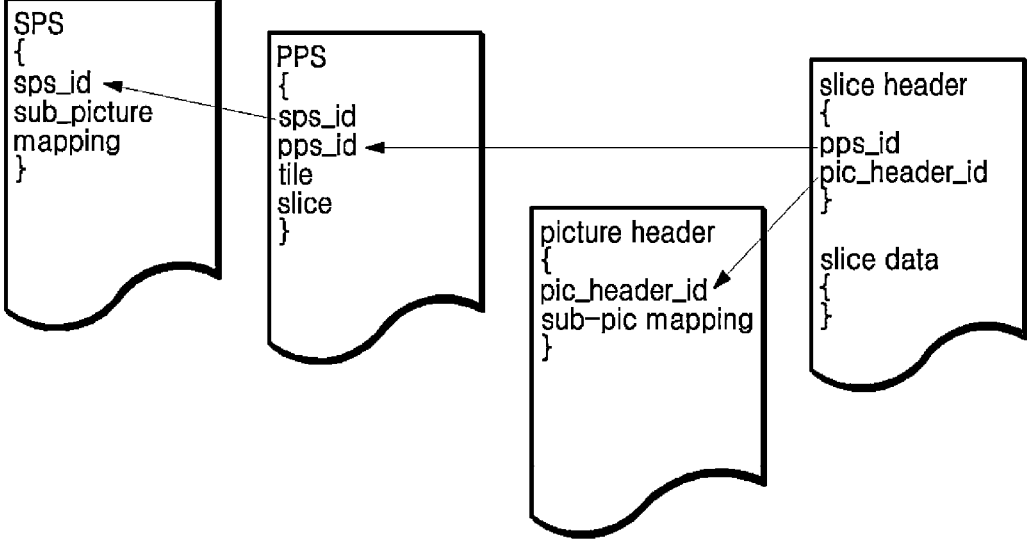
FIG. 20 illustrates a connection relationship between head information.

A connection relationship between the slice NAL, picture header NAL, PPS NAL, and SPS NAL is shown in FIG. 20.

The video decoding apparatus may connect data of the slice header with data of the PPS and data of the picture header using pps_id and pic_header_id of the slice header.

When sps_id is included in the slice header, data may be connected directly from the slice header to the SPS.

The video decoding apparatus may obtain mapping infor-mation of a sub-picture (sub_picture mapping) from the SPS, obtain tile partition information and slice configuration information from the PPS, and obtain mapping information of a sub-picture (sub-pic mapping) from the picture header.

The receiving end (video decoding apparatus) may be divided into a BEAMer for synthesizing content and a decoder for decoding the synthesized data. BEAMer may compose synthesized data by synthesizing multiple pieces of content into one through a process of extracting and syn-thesizing multiple pieces of content. The synthesized data corresponds to input data input to the decoder.

Hereinafter, various sub-picture configuration examples will be described. Various sub-picture configuration examples may be divided into a case in which the sub-picture configuration is not changed and a case in which the sub-picture configuration is changed.

1) FIG. 21(C) shows an example in which the sub-picture configuration is not changed.

From the sub-picture configuration form of FIG. 19 (B), the tile partition form of FIG. 11(A), and the slice configu-ration form of FIG. 19(A), two pieces of content shown in FIGS. 21(A) and (B) may be finally derived. The respective directions of their patterns may distinguish the content of FIG. 21(A) and the content of FIG. 21(B).

The BEAMer may synthesize two pieces of content to generate one combined content, as shown in FIG. 21(C). After receiving all data for the content of FIG. 21(A) and the content of FIG. 21(B), the BEAMer may extract a total of six slice bitstreams as follows from all the received data and input the received data to the decoder.

1) A-0 slice bitstream of FIG. 21(B) content
2) B-0 slice bitstream of FIG. 21(A) content
3) B-1 slice bitstream of FIG. 21(A) content
4) C-0 slice bitstream of FIG. 21(A) content
5) C-1 slice bitstream of FIG. 21(A) content
6) D-0 slice bitstream of FIG. 21(B) content For example, sub-picture A and sub-picture D of FIG. 21(C) may be extracted from the content of FIG. 21(B) to be synthesized, and sub-picture B and sub-picture C of FIG. 21(C) may be extracted from the content of FIG. 21(A) to be synthesized.

In addition to the slice bitstream, header information such as the SPS and PPS are input to the decoder. Also, the picture header that informs of the mapping information of a sub-picture may also be input to the decoder. In this case, the syntax value of the picture header for the example of FIG. 21(C) may be the same as the syntax value of FIG. 16 or FIG. 11(B).

2) FIG. 21(D) shows an example in which the sub-picture configuration is changed. FIG. 21(D) shows a case in which the sub-picture configuration is also changed while two pieces of content are merged.

Figure 21:
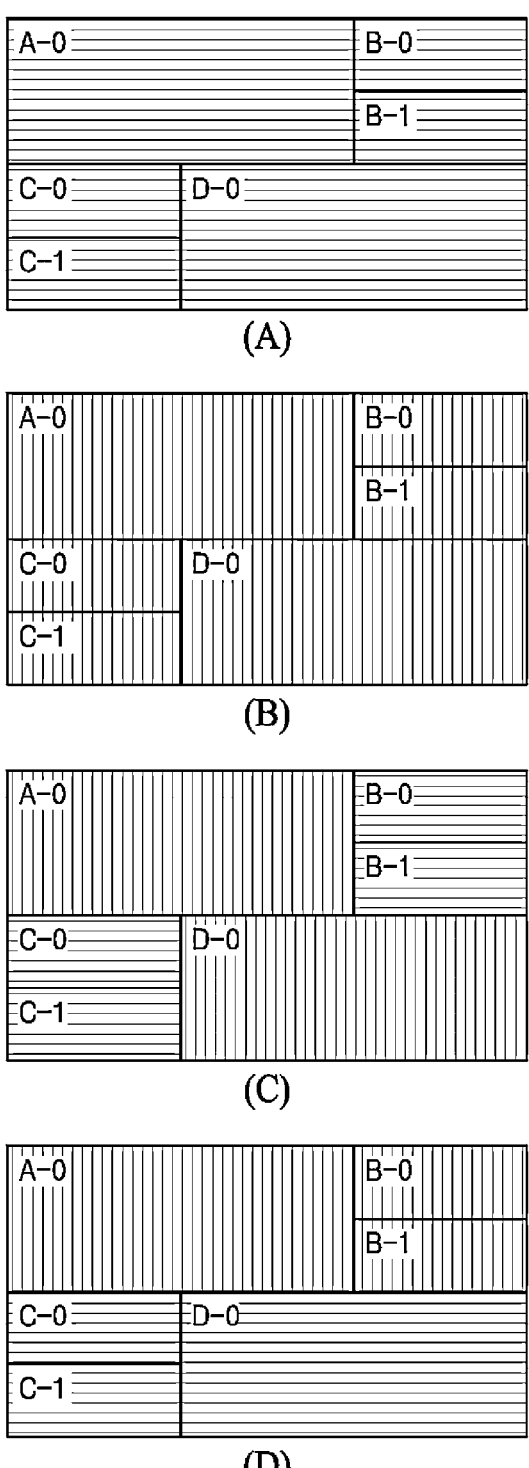
FIG. 21 illustrates various configuration examples of sub-pictures.

The BEAMer may synthesize two pieces of content to generate one combined content, as shown in FIG. 21(D). After receiving all data for the content of FIG. 21(A) and the content of FIG. 21 (B), the BEAMer may extract a total of six slice bitstreams as follows from all the received data and input the extracted data to the decoder.

1) D-0 slice bitstream of FIG. 21(B) content
2) C-0 slice bitstream of FIG. 21(B) content
3) C-1 slice bitstream of FIG. 21(B) content
4) B-0 slice bitstream of FIG. 21(A) content
5) B-1 slice bitstream of FIG. 21(A) content
6) A-0 slice bitstream of FIG. 21(A) content For example, sub-picture D and sub-picture C of FIG. 21(D) may be extracted from the content of FIG. 21(B) to be synthesized, and sub-picture B and sub-picture A of FIG. 21(D) may be extracted from the content of FIG. 21(A) to be synthesized.

When the sub-picture configuration is changed, mapping information of the changed sub-picture should be defined and signaled in a picture header. For example, the transmitting end (video encoding apparatus) may generate and signal the picture header information, or the receiving end (video decoding apparatus) may generate the picture header information.

When the sub-picture configuration is changed, header information such as SPS and PPS is also input to the decoder in addition to the slice bitstream. In addition, the picture header informing of the mapping information of a sub-picture may also be input to the decoder. In this case, the syntax value of the picture header for the example of FIG. 21(D) is as follows.

As shown in Table 14, subpic_id is signaled as many as the number of sub-pictures, and subpic_mapping_enabled_flag=true(1), and subpic_id={D, C, B, A} in the raster-scan order. As shown in Table 15, subpic_id is signaled as many as the number of slices, and subpic_mapping_enabled_flag=true(1), and subpic_id={D, C, C, B, A, B} in the raster-scan order. As shown in Table 15, subpic_id is signaled as many as the number of slices, and subpic_mapping_enabled_flag=true(1), and subpic_id={D, C, C, B, B, A} in the slice configuration order.

As described above, it may be confirmed through FIG. 21(D) that the sub-picture configuration may be easily expressed in the picture header without changing the SPS, PPS, slice header, and/or slice data information.

Although exemplary embodiments have been described for illustrative purposes, those skilled in the art will appreciate that various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A video decoding method, the method comprising:
decoding, from a bitstream, a split flag indicating whether a picture is partitioned into one or more sub-units;
decoding, from the bitstream, a type flag indicating a slice type when the split flag indicates partitioning;
decoding, from the bitstream, partition information related to partitioning of the picture into a plurality of slices when the split flag indicates partitioning and when the type flag indicates a rectangular slice; and
decoding the slices partitioned from the picture based on the partition information,
wherein the partition information includes information on a number of slices and size information of the slices, and
wherein, when a slice is split into a number of tiles, the size information of the slices includes information on a number of columns of tiles included in the slice and information on a number of rows of tiles included in the slice.

2. The method of claim 1,
wherein the partition information includes information on a number of tiles and size information of tiles when the split flag indicates partitioning.

3. The method of claim 1, further comprising:
decoding, from the bitstream, mapping information for mapping one or more sub-pictures to one or more slices belonging to each of the sub-pictures; and
mapping the sub-pictures to the slices based on the mapping information.

4. The method of claim 3, further comprising decoding, from the bitstream, a mapping flag indicating whether mapping is applied to the picture,
wherein, when the mapping flag indicates that mapping is applied, the mapping information includes first mapping information decoded from SPS or PPS of the bitstream.

5. The method of claim 3, wherein, when the split flag indicates partitioning, the mapping information includes second mapping information decoded from a slice header of the bitstream.

6. The method of claim 1, further comprising:
decoding address information of a target slice from a slice header of the bitstream; and
setting, based on the address information, an index of the target slice within a sub-picture in which the target slice is included,
wherein the address information indicates an index of the slice within the picture when the type flag decoded from the bitstream indicates the rectangular slice, and
the address information indicates an index of a tile included in the picture when the type flag indicates a raster-scan slice.

7. A video encoding method, the method comprising:
encoding a split flag indicating whether a picture is partitioned into one or more sub-units;
encoding a type flag indicating a slice type when the split flag indicates partitioning;
encoding partition information related to partitioning of the picture into a plurality of slices when the split flag indicates partitioning and when the type flag indicates a rectangular slice; and
encoding the slices partitioned from the picture,
wherein the partition information includes information on a number of slices and size information of the slices,
wherein, when a slice is split into a number of tiles, the size information of the slices includes information on a number of columns of tiles included in the slice and information on a number of rows of tiles included in the slice.

8. A method for transmitting a bitstream containing encoded video data, the method comprising:
generating the bitstream by encoding video data; and
transmitting the bitstream to a video decoding apparatus,
wherein generating the bitstream comprises:
encoding a split flag indicating whether a picture is partitioned into one or more sub-units;
encoding a type flag indicating a slice type when the split flag indicates partitioning;
encoding partition information related to partitioning of the picture into a plurality of slices when the split flag indicates partitioning and when the type flag indicates a rectangular slice; and
encoding the slices partitioned from the picture,
wherein the partition information includes information on a number of slices and size information of the slices,
wherein, when a slice is split into a number of tiles, the size information of the slices includes information on a number of columns of tiles included in the slice and information on a number of rows of tiles included in the slice.

\* \* \* \* \*